United States Patent
Hori et al.

(10) Patent No.: US 7,924,301 B2
(45) Date of Patent: Apr. 12, 2011

(54) IMAGE FORMING APPARATUS FOR DISK-SHAPED MEDIA

(75) Inventors: Fumihisa Hori, Iwate (JP); Chikashi Osakama, Iwate (JP); Hiroyuki Murayama, Iwate (JP); Makoto Chida, Iwate (JP)

(73) Assignee: Citizen Holdings Co., Ltd., Tokyo (JP)

( * ) Notice: Subject to any disclaimer, the term of this patent is extended or adjusted under 35 U.S.C. 154(b) by 68 days.

(21) Appl. No.: 12/295,186

(22) PCT Filed: Mar. 28, 2007

(86) PCT No.: PCT/JP2007/056585
§ 371 (c)(1),
(2), (4) Date: Sep. 29, 2008

(87) PCT Pub. No.: WO2007/114142
PCT Pub. Date: Oct. 11, 2007

(65) Prior Publication Data
US 2009/0109274 A1     Apr. 30, 2009

(30) Foreign Application Priority Data

Mar. 31, 2006     (JP) ................................ 2006-101074

(51) Int. Cl.
B41J 2/47     (2006.01)
(52) U.S. Cl. ........................................................ 347/225
(58) Field of Classification Search .................. 347/224, 347/225
See application file for complete search history.

(56) References Cited

U.S. PATENT DOCUMENTS 3,588,247 A * 6/1971 Noda ............................... 355/69
4,998,238 A * 3/1991 Mizunoe et al. ............... 369/116
(Continued)

FOREIGN PATENT DOCUMENTS

JP     2000-127473 A     5/2000
(Continued)

OTHER PUBLICATIONS

Japanese Reasons for Refusal, issued May 21, 2010 for corresponding Japanese Patent Application No. 2008-508551.
(Continued)

*Primary Examiner* — Hai C Pham
(74) *Attorney, Agent, or Firm* — Westerman, Hattori, Daniels & Adrian, LLP

(57) ABSTRACT

Problems, which occur when printing is performed on the surface of a rotating disk using by using a print head arranged in the outer circumferential direction from the center of rotation, are resolved. Light emitting sections performs exposure in synchronism with rotational driving for rotating a medium, and pixels which are adjacent in the circumferential direction of rotation are exposed in a partially superimposed fashion by making the amount of movement in the circumferential direction along which the outermost circumference of the medium moves between exposures smaller than the width in the circumferential direction of the pixels formed by exposure. In a plurality of light emitting sections provided in an optical unit, the quantity of light for exposing a pixel on the inner circumferential side in the radial direction is set to be smaller than the quantity of light for exposing a pixel on the outer circumferential side in the radial direction for the respective exposure positions for the medium. Therefore, difference in the tonal shading caused by superposition is reduced by lowering the density created by each exposure in respect of the pixels on the inner circumferential side in the radial direction where there is a large overlap between exposures.

12 Claims, 29 Drawing Sheets

U.S. PATENT DOCUMENTS

| | | | |
|---|---|---|---|
| 5,483,511 A * | 1/1996 | Jewell et al. | 369/44.37 |
| 2006/0066714 A1 | 3/2006 | Hayashi | |
| 2006/0092784 A1 * | 5/2006 | Anderson et al. | 369/44.38 |
| 2007/0256088 A1 * | 11/2007 | Yamamoto et al. | 720/601 |

FOREIGN PATENT DOCUMENTS

| | | | |
|---|---|---|---|
| JP | 2001-203321 A | 7/2001 |
| JP | 2003-19828 A | 1/2003 |
| JP | 2003-257153 A | 9/2003 |
| JP | 2004-109696 A | 12/2004 |
| JP | 2005-267737 A | 9/2005 |
| JP | 2006-85849 A | 6/2006 |

OTHER PUBLICATIONS

International Search Report of PCT/JP2007/056585, date of mailing Jul. 3, 2007.

Notification of Transmittal of Translation of the International Preliminary Report on Patentability (Form PCT/IB/338) of International Application No. PCT/JP2007/056585 mailed Oct. 30, 2008 with Forms PCT/IB/373 and PCT/ISA/237.

Chinese Office Action dated Aug. 3, 2010, issued in corresponding Chinese Patent Application No. 200780010742.0.

* cited by examiner

FIG. 3A PERPENDICULAR COORDINATES SYSTEM IMAGE DATA
(0, 0)
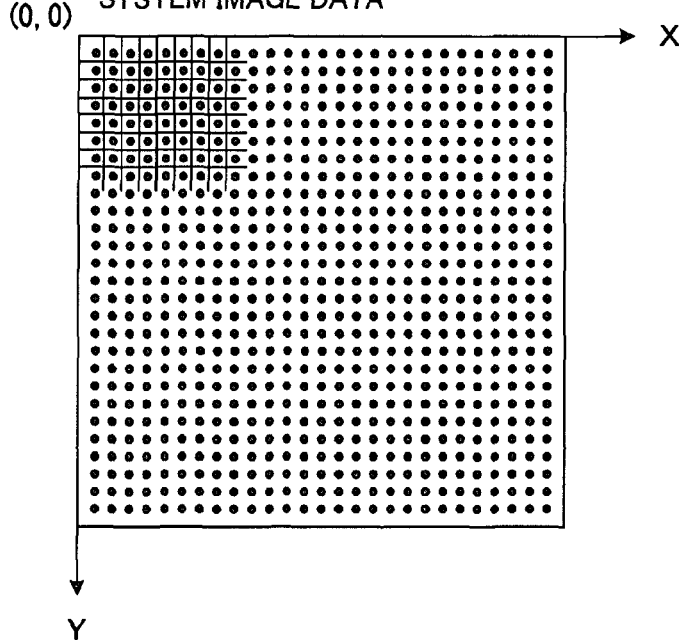
FIG. 3B PERPENDICULAR COORDINATES SYSTEM IMAGE DATA
(0, 0)
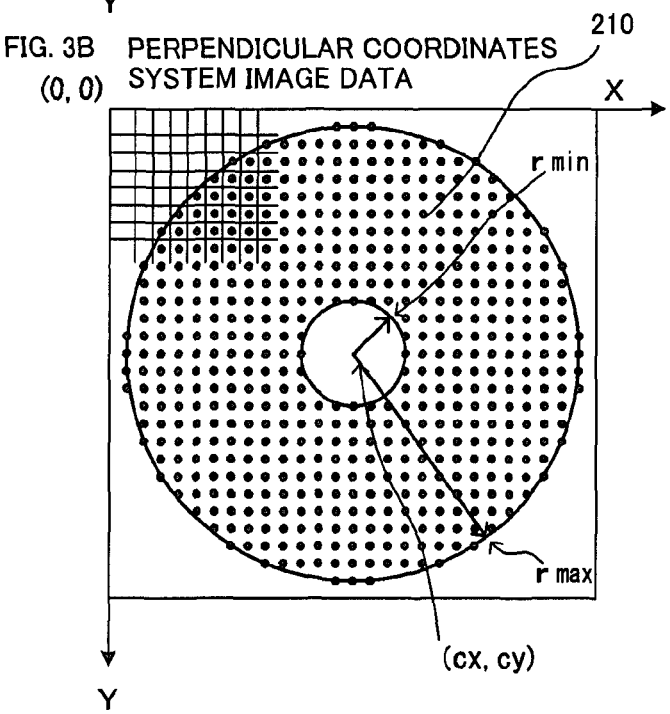
FIG. 3C
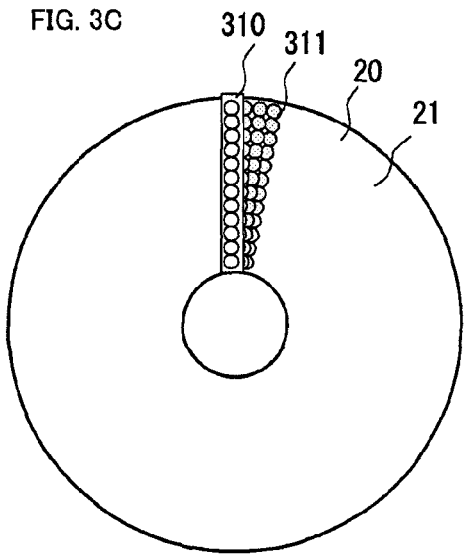

FIG. 8A 200
PERPENDICULAR COORDINATES
SYSTEM IMAGE DATA
FIG. 8B 500
POLAR COORDINATES
SYSTEM IMAGE DATA
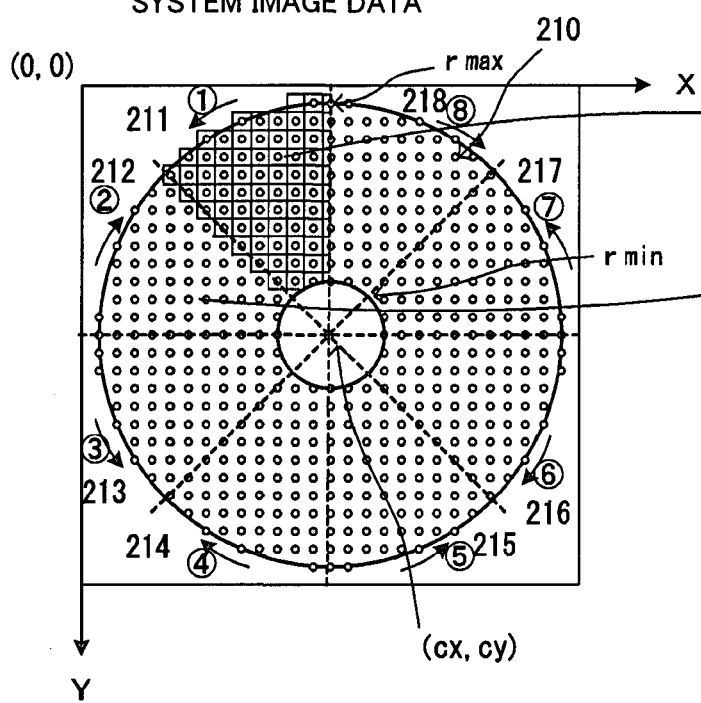
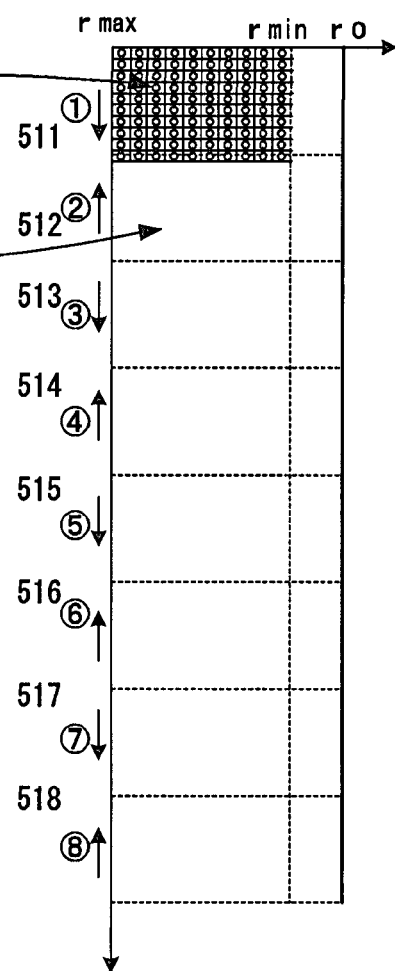

$x = r \cos \theta$  $r : \text{RADIUS}(r\min \leqq r \leqq r\max)$ $y = r \sin \theta$  $\theta : 0° \sim 45°$

| FIRST SEGMENT | $P1\ (px1, py1) = (cx-y, cy-x)$ |
|---|---|
| SECOND SEGMENT | $P2\ (px2, py2) = (cx-x, cy-y)$ |
| THIRD SEGMENT | $P3\ (px3, py3) = (cx-x, cy+y)$ |
| FOURTH SEGMENT | $P4\ (px4, py4) = (cx-y, cy+x)$ |
| FIFTH SEGMENT | $P5\ (px5, py5) = (cx+y, cy+x)$ |
| SIXTH SEGMENT | $P6\ (px6, py6) = (cx+x, cy+y)$ |
| SEVENTH SEGMENT | $P7\ (px7, py7) = (cx+x, cy-y)$ |
| EIGHTH SEGMENT | $P8\ (px8, py8) = (cx+y, cy-x)$ |

FIG. 10

|  | $V_0$ | $V_1$ | $V_2$ | $V_3$ |
|---|---|---|---|---|
| FIRST SEGMENT | m, n+1 | m−1, n+1 | m, n | m−1, n |
| SECOND SEGMENT | m+1, n | m+1, n−1 | m, n | m, n−1 |
| THIRD SEGMENT | m+1, n | m+1, n+1 | m, n | m, n+1 |
| FOURTH SEGMENT | m, n−1 | m−1, n−1 | m, n | m−1, n |
| FIFTH SEGMENT | m, n−1 | m+1, n−1 | m, n | m+1, n |
| SIXTH SEGMENT | m−1, n | m−1, n+1 | m, n | m, n+1 |
| SEVENTH SEGMENT | m−1, n | m−1, n−1 | m, n | m, n−1 |
| EIGHTH SEGMENT | m, n+1 | m+1, n+1 | m, n | m+1, n |

FIG. 15

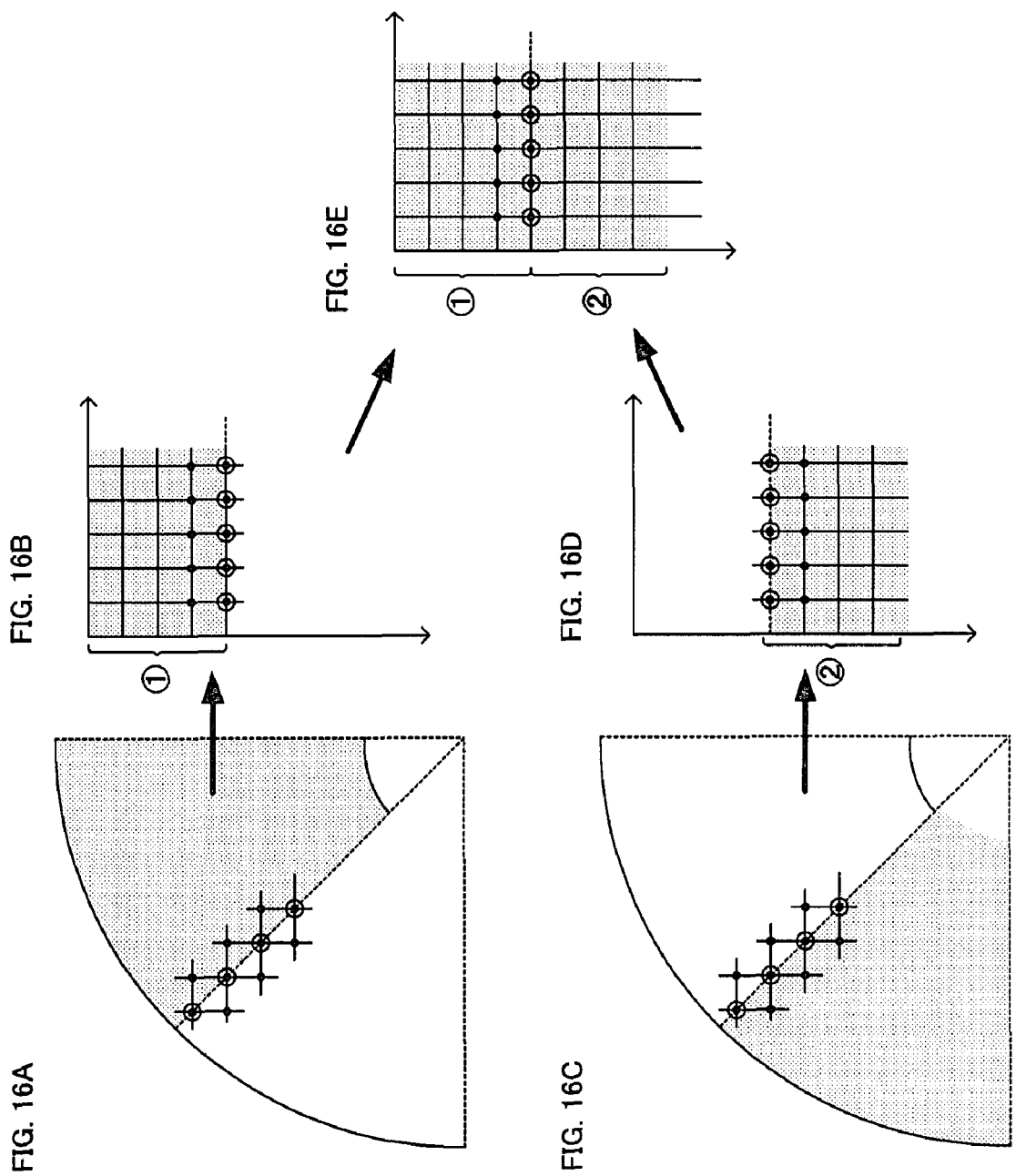

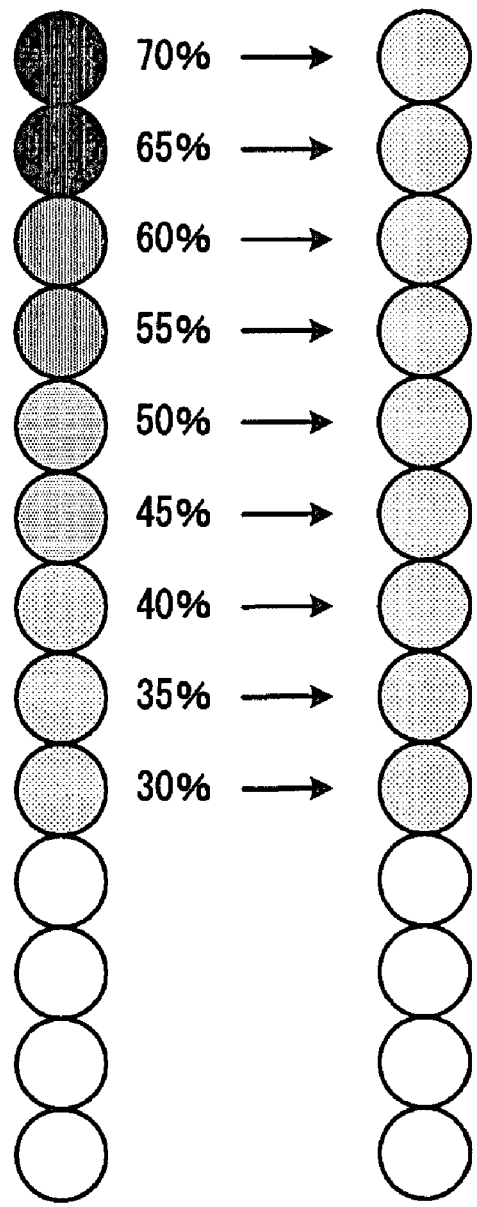

AMOUNT OF
COLOR ERASURE

PRINT RESULT

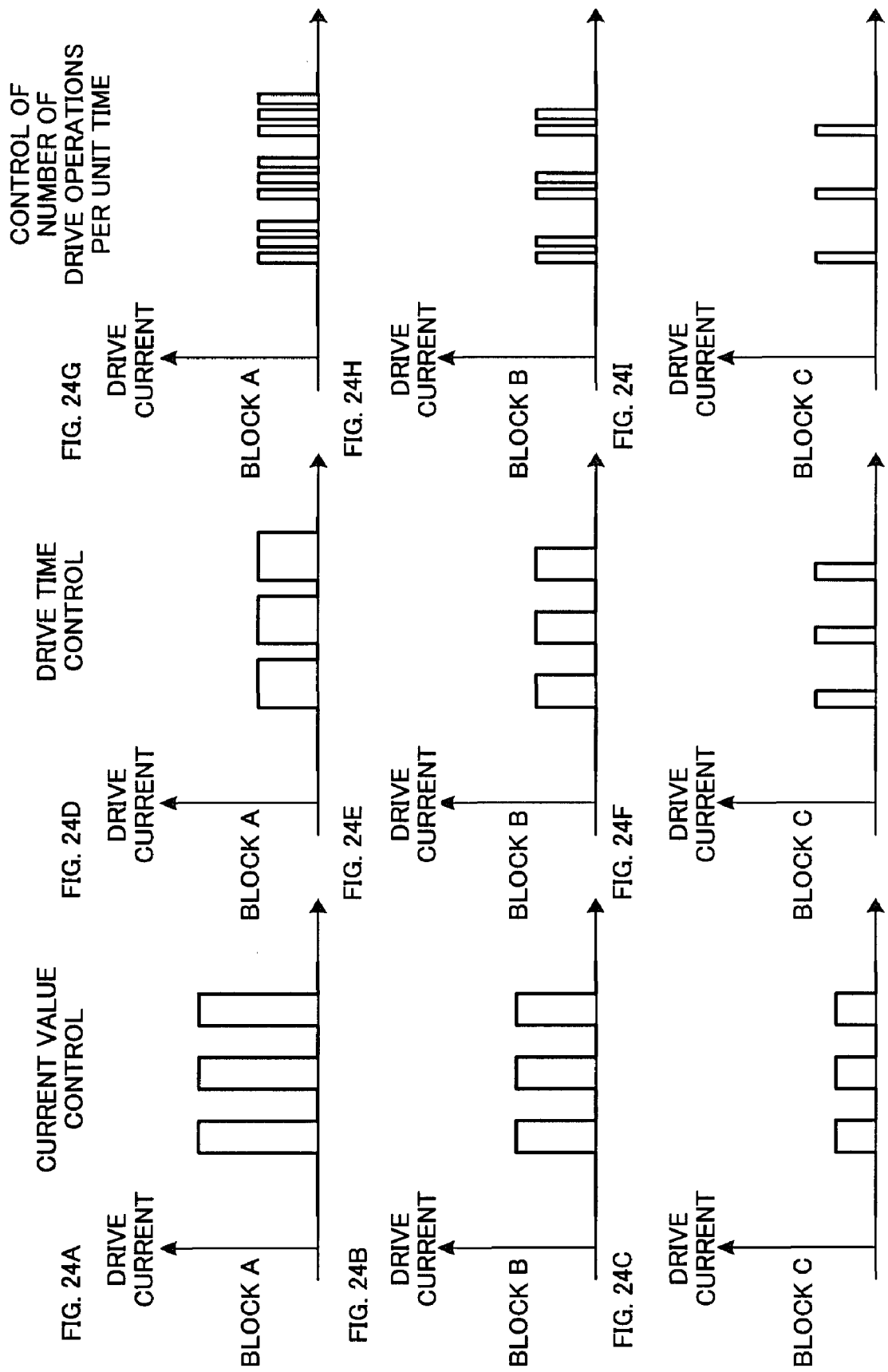

AMOUNT OF COLOR ERASURE   PRINT RESULT

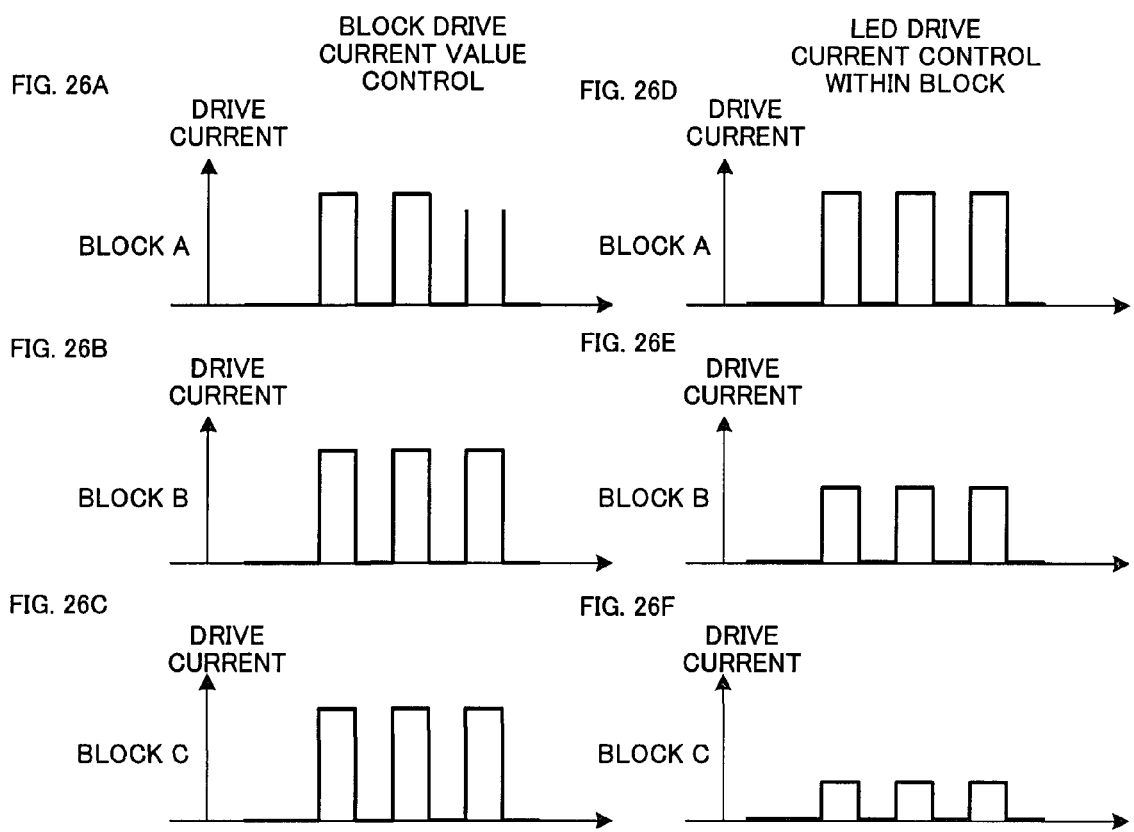

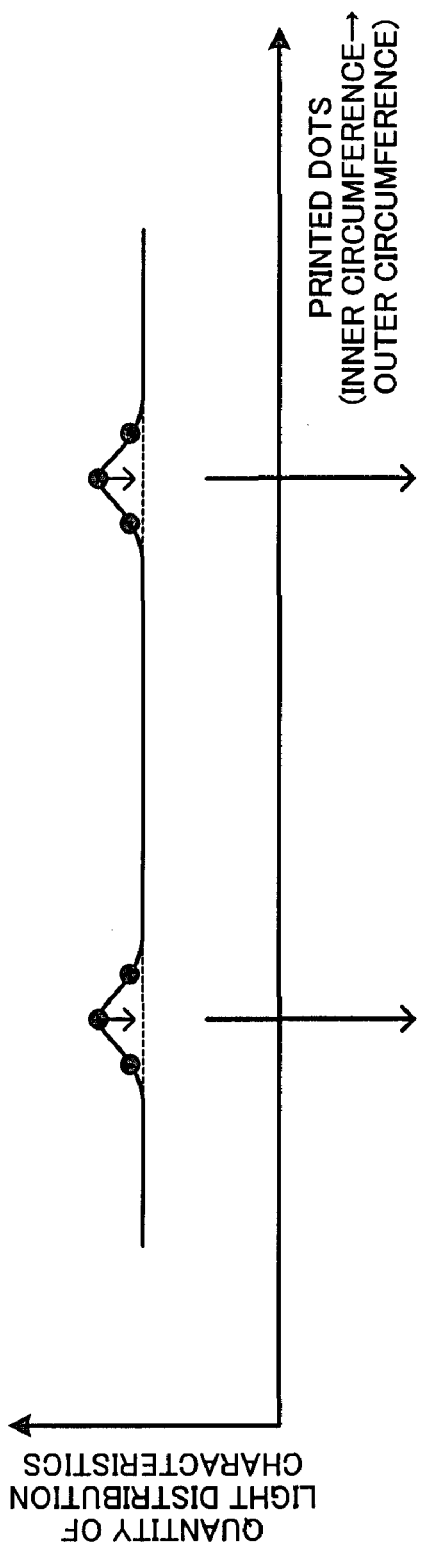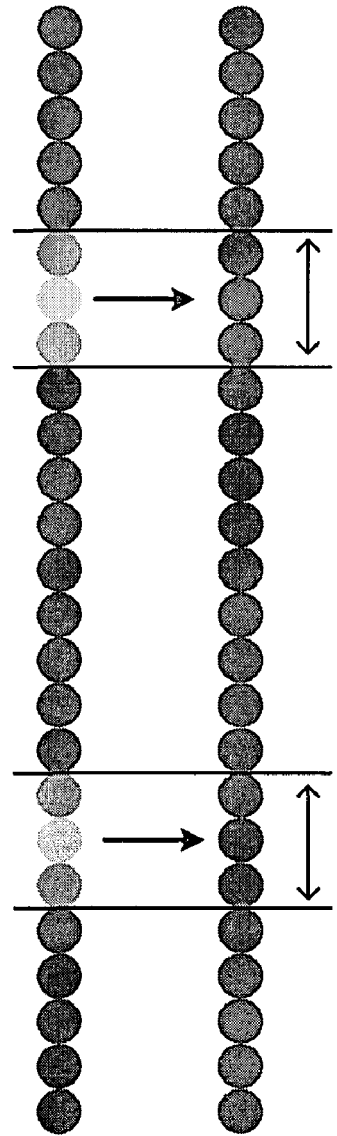
FIG. 28A  FIG. 28B  FIG. 28C  FIG. 28D

IMAGE FORMING APPARATUS FOR DISK-SHAPED MEDIA

TECHNICAL FIELD

The present invention relates to an image forming apparatus and more particularly to an image forming apparatus which forms images on a disk-shaped medium.

BACKGROUND

Disk-shaped media such as CD, CD-R, CD-RW, DVD, DVD-RAM, and the like, are known as recording media for recording electronic data such as images, videos, sound, documents and the like. When writing and recording various types of data on these disk-shaped media, there are cases where information such as a title relating to the recorded contents is inscribed on the surface of the disk-shaped medium in order that the contents recorded on the disk-shaped medium can be identified visually.

In this case, generally, the information is written on the surface of the disk-shaped medium using a writing tool, but there are also cases where recording information is printed on a separately prepared paper label by a printer and then the label is attached to the surface of the disk-shaped medium.

When information is written directly to the surface of the disk-shaped medium in this way, since a writing tool is used then there is a risk of damaging the recorded surface of the medium, and if the information is printed onto a paper label using a printer, then there is a problem in that a printer has to be provided separately.

Therefore, an optical disk apparatus has been proposed which removes the need for writing using a writing tool or printing by a printer in order to form an image on the label surface by means of laser light (see Patent Document 1).

In the printer described in this patent document, an optical disk on which a visible light properties modification layer consisting of a photosensitive material or a thermosensitive material, or the like, is formed in a location where it can be observed from the label surface side, is set on the turntable of an optical disk apparatus with the label surface of the disk facing toward an optical pick-up. Once set in position, the optical disk and the optical pick-up are made to rotate relatively with respect to each other over the surface of the optical disk and in synchronism with this movement, laser light power emitted from the optical pick-up is irradiated onto the visible light properties modification layer while modulating the laser light in accordance with image data, such as characters or a picture that it is wished to create. Due to the irradiation of the laser light, the visible light properties are changed in the visible light properties modification layer and hence an image is formed.

Patent Document 1: Japanese Patent Application Publication No. 2001-203321
Patent Document 2: Japanese Patent Application Publication No. 2003-257153

A printer such as that described in the patent reference mentioned above is problematic in that since an image is formed on the surface of the optical disk by progressive dot scanning which prints successively in a spiral shape or concentric shape, one pixel at a time, while moving the optical disk and the optical pick-up relatively over the surface of the optical disk, then a long time is required in order to form an image.

A recording method is known in which a recording head is disposed in a radiating configuration from the central portion of a disk-shaped recording medium such as that described above, with respect to the recording surface of the recording medium, and line-shaped recording is carried out successively in synchronism with the rotation of the recording medium.

Normally, the tone value of a pixel in the signal image data is determined at a coordinates point in a perpendicular coordinates system. This coordinates point is specified as a coordinates position which is represented by integer values on the perpendicular coordinates system. Below, this type of coordinates point is called an integer coordinates point.

On the other hand, if a recording head is disposed in a radiating fashion from the central portion of a disk-shaped recording medium and line-shaped recording is performed successively in synchronism with the rotation of the recording medium, then positional deviation will occur in the points which are printed on the disk surface if printing is performed by using the coordinates points on the perpendicular coordinates system directly without any modification, and hence there is a risk that the printing quality will decline. This occurs because, when a coordinates point in a polar coordinates system is expressed in a perpendicular coordinates system, the coordinates position is a real number and therefore does not necessarily coincide with the coordinates position expressed by integers in the perpendicular coordinates system. Consequently, the coordinates points which are arranged in a lattice shape in the perpendicular coordinates system do not necessarily coincide with the positions of the dots that are printed by the rotating recording head.

Furthermore, if printing is carried out onto the surface of a rotating disk by using a print head in which printing elements are arranged in the outer circumferential direction from the center of rotation, then there are problems in that tonal shading occurs in the radial direction, incomplete portions arise in solid filled image areas, and missing lines or overlaps occur in the printed lines.

FIG. 29 serves to illustrate problems involved in printing onto a disk-shaped recording medium of this kind. In FIG. 29, when printing is carried out by light-emitting elements arranged in a row configuration aligned in the outer circumferential direction, a larger overlap occurs between the printed dots on the inner circumferential side of the disk, and therefore even in the case of image data for a uniform image, tonal shading (gradation) 101 occurs from the outer circumferential side toward the inner circumferential side.

Furthermore, depending on the shape of the printed dots, incomplete portions 102 occur in solid filled image areas, such as portions which are left without printing, or duplicated printing portions where printed is performed in a superimposed fashion. These incomplete portions 102 appear as circular bands on the disk.

Moreover, if the timing of the printing operation is controlled by time management of light-emitting elements arranged in a row configuration, then if there is a non-uniformity in the rotation of the disk, either missing parts 103 or overlapping parts will occur in the printed lines.

In order to resolve the problem of tonal shading (gradation) from the outer circumferential side toward the inner circumferential side of this kind, which arises in disk-shaped recording media, technology has been proposed for correcting and standardizing the density in the outer circumferential portion and the inner circumferential portion by thinning out the picture of text data that is to be printed on the surface of the disk-shaped recording medium (see, for example, Patent Document 2).

However, in image data processing for thinning data in this way, for instance, it is only possible to thin out a centrally placed dot if there is overlap between three mutually adjacent dots. Therefore, it is not necessarily the case that image data can be thinned on the basis of the image data to be printed, and hence there is a problem in that the overlap between dots on the inner circumferential side cannot be eliminated completely.

Consequently, when printing onto a disk-shaped recording medium in synchronism with the rotation of the recording medium by using a recording head which is disposed in a radiating configuration from the center of rotation of the disk-shaped recording medium, with respect to a recording surface of the disk-shaped recording medium, it is necessary to resolve the aforementioned problems which are characteristic of printing onto a disk-shaped recording medium.

DISCLOSURE OF THE INVENTION

Hence, the object of the present invention is to resolve specific problems which occur when printing is performed on a disk-shaped medium The object of the present invention is to resolve problems which arise when printing onto the surface of a rotating disk by using a print head arranged in the outer circumferential direction from the center of rotation, and to resolve problems of tonal shading in the radial direction, the problem of incomplete portions in solid image areas, and the problem of missing parts and overlapping parts in the printed lines.

A further object of the present invention is to resolve positional deviation of image data which is generated when printing onto a disk-shaped recording medium by using image data based on pixel tone values that are specified for integer coordinates points on a perpendicular coordinates system.

The present invention firstly eliminates the occurrence of incomplete portions in solid image areas and of missing parts and overlapping parts in printed lines by printing so as to cause partial overlapping between pixels which are mutually adjacent in the circumferential direction of rotation, and furthermore eliminates the occurrence of tonal shading in the radial direction by adjusting the printing density of the respective pixels.

The image forming apparatus according to the present invention is an image forming apparatus which forms an image by exposing the surface of a disk-shaped medium in respective pixels by means of light irradiated from an optical unit, and the optical unit comprises a plurality of light emitting sections which are arranged in the radial direction of rotation of the medium.

The light emitting sections according to the present invention carry out exposure by mutually overlapping a portion of pixels which are adjacent in the circumferential direction of rotation, in respect of all of the pixels on the medium.

The optical unit exposes pixels of one line aligned in the radial direction on the medium by one light irradiating operation, by means of the plurality of light emitting sections which are arranged in the radial direction of rotation of the medium. By repeating this light exposure in synchronism with the rotation of the medium, an image is formed on the label surface of the medium.

By partially overlapping the pixels which are mutually adjacent in the circumferential direction of rotation when performing light exposure in synchronism with the rotation of the medium, the occurrence of unexposed parts between adjacent pixels is prevented and hence the occurrence of incomplete portions in solid filled image areas is resolved.

The light emitting sections perform exposure in synchronism with rotational driving for rotating the medium, and in this light exposure, the amount of movement in the circumferential direction along which the outermost circumference of the medium moves during the interval between exposures is made smaller than the width in the circumferential direction of the pixels which are formed by the light exposure, thereby causing a partial overlap in exposure between the pixels which are adjacent in the circumferential direction of rotation. The light emitting sections are not limited to self-emitting elements and may also use elements which shield/transmit or reflect the light from a light source, such as a liquid crystal shutter, for example.

Furthermore, in the image forming apparatus according to the present invention, in order to reduce the problem of the occurrence of tonal shading (gradation) in the radial direction due to superposed exposure on the same pixel when it is sought to form an image of single uniform density, the quantity of light for exposing a pixel on the inner circumferential side in the radial direction is made smaller than the quantity of light for exposing a pixel on the outer circumferential side in the radial direction for the respective exposure positions, for the medium, of the plurality of light emitting sections provided in the optical unit. By this means, the difference in tonal shading caused by superposition is reduced by lowering the density formed by each exposure operation in the case of pixels on the inner circumferential side in the radial direction where there is a large amount of overlap between exposures.

The light emitting sections according to the present invention comprise a plurality of modes for reducing the quantity of exposure light on the inner circumferential side in the radial direction.

A first mode of reducing the quantity of exposure light on the inner circumferential side in the radial direction is based on the drive current, and in the respective exposure positions of the plurality of light emitting sections on the medium, the drive current of the light emitting sections which expose pixels on the inner circumferential side in the radial direction is made smaller than the drive current of the light emitting sections which expose pixels on the outer circumferential side in the radial direction. Consequently, the quantity of exposure light on the inner circumferential side in the radial direction is made smaller than the quantity of exposure light on the outer circumferential side.

Furthermore, a second mode of reducing the quantity of exposure light on the inner circumferential side in the radial direction is based on the exposure time, and in the respective exposure positions of the plurality of light emitting sections for the medium, the exposure time for exposing pixels on the inner circumferential side in the radial direction is made shorter than the exposure time for exposing pixels on the outer circumferential side in the radial direction. Consequently, the quantity of exposure light on the inner circumferential side in the radial direction is made smaller than the quantity of exposure light on the outer circumferential side.

Furthermore, a third mode of reducing the quantity of exposure light on the inner circumferential side in the radial direction is based on the number of exposure operations per unit time, and in the respective exposure positions of the plurality of light emitting sections for the medium, the number of exposure operations per unit time for exposing pixels on the inner circumferential side in the radial direction is made smaller than the number of exposure operations per unit time for exposing pixels on the outer circumferential side in the radial direction. Consequently, the quantity of exposure light on the inner circumferential side in the radial direction is made smaller than the quantity of exposure light on the outer circumferential side.

Furthermore, the optical unit according to the present invention is composed by dividing the plurality of light emitting sections into a plurality of blocks, each block performing exposure respectively as an independent unit. In the optical unit, the plurality of light emitting sections are divided into a plurality of blocks on the basis of one or a plurality of light emitting sections which are mutually adjoining in the radial direction; and the light emitting sections within each block are driven as a single unit, the quantity of light emitted by the light emitting sections in a block on the inner circumferential side in the radial direction being made smaller than the quantity of light emitted by the light emitting sections in a block on the outer circumferential side in the radial direction. The light emitting sections contained in each of the blocks can be driven under the same drive conditions or under different drive conditions. Furthermore, apart from driving all of the blocks included in the optical unit simultaneously, it is also possible to drive the blocks by selecting from all of the blocks included in the optical unit.

The present invention comprises two modes for dividing into blocks in this way. A first mode adopts a composition in which each block contains substantially the same number of light emitting sections and a second mode adopts a composition in which each block contains different numbers of light emitting sections.

In the first mode, each of the blocks provided in the optical unit has substantially the same number of light emitting sections, and within each of the blocks, the plurality of light emitting sections contained in the block are driven under the same drive conditions, and the respective blocks are driven under different drive conditions, the quantity of light emitted by the light emitting sections in a block on the inner circumferential side in the radial direction being made smaller than the quantity of light emitted by the light emitting sections in a block on the outer circumferential side in the radial direction.

In the first mode, it is possible to reduce the quantity of exposure light in a block on the inner circumferential side in the radial direction by means of a plurality of modes.

A first mode of reducing the quantity of exposure light of a block on the inner circumferential side in the radial direction is based on the drive current, and the relationship in the quantity of light between blocks is set by making the drive current of the light emitting sections in a block on the inner circumferential side in the radial direction smaller than the drive current of the light emitting sections in a block on the outer circumferential side in the radial direction. Consequently, the quantity of exposure light emitted by a block on the inner circumferential side in the radial direction is made smaller than the quantity of exposure light emitted by a block on the outer circumferential side.

Furthermore, a second mode of reducing the quantity of exposure light of a block on the inner circumferential side in the radial direction is based on the drive time, and the relationship in the quantity of light between blocks is set by making the drive time of the light emitting sections in a block on the inner circumferential side in the radial direction shorter than the drive time of the light emitting sections in a block on the outer circumferential side in the radial direction. Consequently, the quantity of exposure light emitted by a block on the inner circumferential side in the radial direction is made smaller than the quantity of exposure light emitted by a block on the outer circumferential side.

Furthermore, a third mode of reducing the quantity of exposure light of a block on the inner circumferential side in the radial direction is based on the number of exposure operations per unit time, and the relationship in the quantity of light between blocks is set by making the number of exposure operations per unit time of the light emitting sections in a block on the inner circumferential side in the radial direction smaller than the number of exposure operations per unit time of the light emitting sections in a block on the outer circumferential side in the radial direction. Consequently, the quantity of exposure light emitted by a block on the inner circumferential side in the radial direction is made smaller than the quantity of exposure light emitted by a block on the outer circumferential side.

A second mode adopts a composition in which the number of light emitting sections provided in each block differs in the radial direction. In this second aspect, the light emitting sections provided in the optical unit are divided into a plurality of blocks consisting of one light emitting section or a plurality of light emitting sections which are adjoining in the radial direction, and the number of light emitting sections belonging to each block is set in such a manner that the number of light emitting sections belonging to a block on the inner circumferential side in the radial direction is greater than the number of light emitting sections belonging to a block on the outer circumferential side in the radial direction. The same drive current is supplied to each of the blocks in this composition and this drive current is divided amongst the number of light emitting sections in the block and used to drive the light emitting sections, in such a manner that quantity of light emitted by each block is substantially the same quantity.

Consequently, the quantity of exposure light emitted by a block on the inner circumferential side in the radial direction is made smaller than the quantity of exposure light emitted by a block on the outer circumferential side.

Secondly, the present invention provides an image forming apparatus which forms an image by exposing the surface of a disk-shaped medium in respective pixels by means of light irradiated from an optical unit, characterized in that image data having pixel tone values specified for integer coordinates points of a perpendicular coordinates system is converted into image data having pixel tone values specified for coordinates points of a polar coordinates system. By this means, when carrying out printing by recording in a line shape in synchronism with the rotation of a disk-shaped recording medium, using a recording head which is arranged in a radiating configuration from the central portion of the recording medium, positional deviation of the image data is eliminated and good image quality can be obtained.

The image forming apparatus according to the present invention comprises a printer section which forms an image on the surface of the disk-shaped medium and a printing image data converting section which converts image data to printing image data which can be printed by the printer section. The printer section prints an image onto the disk-shaped medium by causing the disk-shaped medium to rotate relatively in the circumferential direction of the disk-shaped medium with respect to an optical unit comprising a plurality of light emitting sections which are arranged in the radial direction of the disk-shaped medium.

On the other hand, the printing image data converting section comprises a polar coordinates system raster data generating section which converts pixel tone values of integer coordinates points of a perpendicular coordinates system, which is the input image data, into pixel tone values of coordinates points of a polar coordinates system, which is the printing image data. The polar coordinates system raster data generating section interpolates a pixel tone value for a real number coordinates point which corresponds to a coordinates point of the polar coordinates system, on the perpendicular coordinates system, by using the pixel tone values assigned to four immediately adjacent integer coordinates points which surround the corresponding real number coordinates point, and sets the pixel tone value thus calculated as a pixel tone value of the polar coordinates system raster data.

The image data generated by the polar coordinates system raster data generating unit according to the present invention has pixel tone values at coordinates points specified in a polar coordinates system, and since the coordinates points specified in this polar coordinates system correspond to the printed dot positions when carrying out printing by line-shaped recording in synchronism with the rotation of the recording medium by using a recording head arranged in a radiating configuration from the central portion of the disk-shaped recording medium, then it is possible to eliminate positional deviation of the image data.

Furthermore, the polar coordinates system raster data generating section according to the present invention: divides a polar coordinates system having a point of origin at the central point of the disk-shaped medium into eight segments of 45° each, taking the radial direction from the outer circumference toward the inner circumference in each segment as the main scanning direction, and taking the circumferential direction as the sub-scanning direction; and generates raster data at coordinates points which are specified in these scanning directions. In generating this raster data, the polar coordinates system raster data generating section interpolates the pixel tone values of corresponding coordinates points by making the main scanning direction correspond to the y axis direction of the perpendicular coordinates system, making the sub-scanning direction correspond to the x axis direction of the perpendicular coordinates system, and using the pixel tone values assigned to four immediately adjacent integer coordinates points which surround a corresponding real number coordinates point on the polar coordinates system.

By using the pixel tone values of the four integer coordinates points which surround a real number coordinates point which is specified in the sub-scanning direction and the main scanning direction as described above, as the pixel tone values to be employed in the interpolation of the pixel tone values in the real number coordinates points, then it is possible to form a smooth image.

Furthermore, the interpolation of the pixel tone values performed by the polar coordinates system raster data generating section according to the present invention can employ linear interpolation based on a bilinear method of the pixel tone values of the four integer coordinates points in accordance with the distances to these four integer coordinates points from the real number coordinates point corresponding to the polar coordinates system.

Furthermore, the printing image data converting section according to the present invention comprises an image enlargement and reduction section which enlarges and reduces the number of elements of image data.

This image enlargement and reduction section harmonizes the number of elements of the polar coordinates system raster data in the sub-scanning direction with the number of printed dots in the circular circumferential direction in the segment. By this means, it is possible to prepare pixel tone values corresponding to the respective printed dots.

Furthermore, it enlarges the number of image data elements in the main scanning direction of the perpendicular coordinates system in accordance with the printing pitch. By this means, for example, if printing is carried out at ½ pitch, then it is possible to harmonize the image data with the printing pitch by enlarging the original image data by a factor of two.

Furthermore, as data processing for improving the print quality, the polar coordinates system raster data generating section according to the present invention generates duplicated pixel tone values at the coordinates points in the boundaries in the main scanning direction between segments which are mutually adjacent in the circumferential direction. The image enlargement and reduction section then reduces the coordinates points in the boundary which have been generated in a duplicated fashion in this way, and the same pixel tone value is set for the coordinates points in the boundaries in the main scanning direction between segments which are mutually adjacent in the circumferential direction. Consequently, when the disk-shaped medium is divided into eight segments of 45° each and image printing is carried out by using raster data generated in the respective segments, deviations in printing in the boundary portions are eliminated.

This image enlargement and reduction section is able to interpolate the pixel tone values of the coordinates points by linear interpolation using a bilinear method.

According to the image forming apparatus of the present invention, it is possible to eliminate problems which occur when printing onto the surface of a rotating disk by using a print head arranged in the outer circumferential direction from the center of rotation.

According to the present invention, by performing exposure by partially overlapping pixels which are mutually adjacent in the circumferential direction of rotation, the occurrence of unexposed parts between adjacent pixels is prevented and hence the occurrence of incomplete portions in solid filled image areas is eliminated, and the problem of missing print lines or overlapping print images can also be resolved.

Furthermore, in the image forming apparatus according to the present invention, by making the quantity of light for exposing the pixels on the inner circumferential side in the radial direction smaller than the quantity of light for exposing the pixels on the outer circumferential side in the radial direction, in the plurality of light emitting sections provided in the optical unit, then it is possible to reduce differences in the tonal shading caused by superimposed exposure by reducing the density formed by the respective exposures in the pixels on the inner circumferential side in the radial direction where there is large amount of overlap between exposures.

Moreover, according to the present invention, it is possible to eliminate positional deviation of the image data which occurs when printing onto a disk-shaped recording medium using image data having pixel tone values which are specified for integer coordinates points on a perpendicular coordinates system.

BRIEF DESCRIPTION OF THE DRAWINGS

FIGS. 3A to 3C are diagrams showing the relationship between printed dots and original image data;

FIGS. 8A and 8B are diagrams for describing the relationship between the perpendicular coordinates system image data and polar coordinates system image data according to the present invention;

FIG. 10 is a diagram for describing segments set in the printing image data creation process according to the present invention;

FIG. 15 is a diagram for describing a method of determining real number coordinates points in a perpendicular coordinates system which correspond to coordinates points in a polar coordinates system according to the present invention, by means of a bilinear method;

FIGS. 16A to 16E are diagrams for describing the setting of image data in a boundary portion between adjacent segments according to the present invention;

FIGS. 21A and 21B are diagrams for describing the quantity of exposure light emitted by the light emitting sections of the light emitting unit according to the present invention;

FIGS. 24A to 24I are current diagrams for describing an operation according to a first mode which adopts a composition wherein the respective blocks according to the present invention contain substantially the same number of light emitting sections;

FIGS. 26A to 26F are current diagrams for describing an operation according to a second mode which adopts a composition wherein the respective blocks according to the present invention contain different numbers of light emitting sections;

FIGS. 28A to 28D are diagrams for describing a quantity of light non-uniformity correction process according to the present invention.

Figure 1:
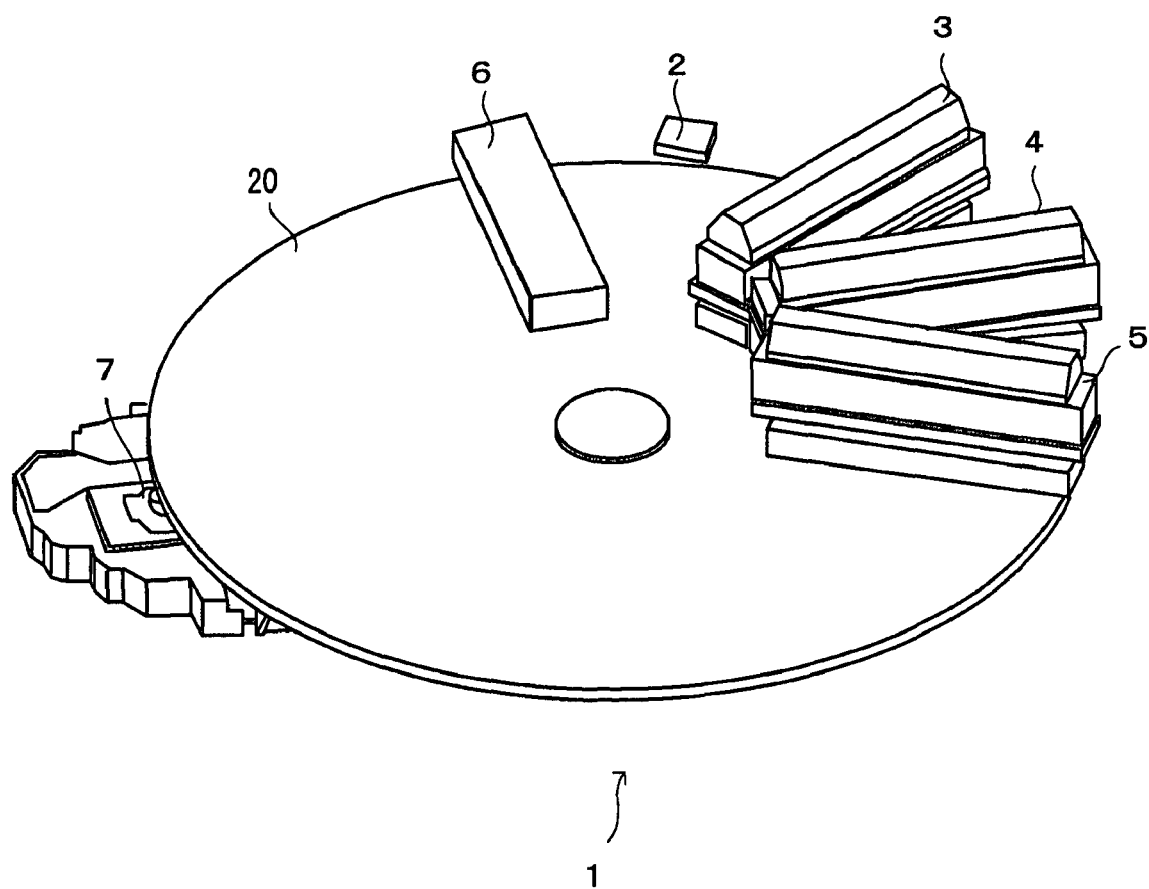
FIG. 1 is an approximate oblique diagram for describing the approximate composition of an image forming apparatus according to the present invention.

1 image forming apparatus
2 color generation unit
3 first color erasure unit
4 second color erasure unit
5 third color erasure unit
6 fixing unit
7 pick up
8 rotational drive apparatus
10 optical unit
11 light source
11A to 11D block
12 light emitting section
13 optical lens
20 medium
21 label surface
30a, 30b image forming region
101 tonal shading (gradation)
102 incomplete portion
103 missing printed line
200 perpendicular coordinates system image data
210 print region
211 to 218 segment
300 printer section
310 head
311 printed dot
320 printer control section
330 medium drive section
400 printing image processing section
410 image data input section
420 image data storage section
430 image enlargement and reduction section
440 polar coordinates system raster data generating section
441 coordinates converting section
442 adjacent data reading section
443 perpendicular coordinates system image data storage section
444 image data interpolation section
500 polar coordinates system image data
511 to 518 segment

BEST MODE FOR CARRYING OUT THE INVENTION

Firstly, an embodiment of the image forming apparatus according to the present invention will be described.

Below, the image forming apparatus according to the present invention is described in detail with reference to the drawings.

Firstly, the general composition of the image forming apparatus of the present invention is described with reference to the general perspective diagram in FIG. 1 and the general cross-sectional diagram in FIG. 2.

In the general compositional diagram of the image forming apparatus shown in FIG. 1, the image forming apparatus 1 comprises a mechanism (not illustrated) for driving a medium 20 in rotation and a pick up 7 which optically records information onto an information recording surface of the medium 20; the pick up 7 carries out recording by irradiating laser light onto the information recording surface of the medium 20 on the basis of the data to be recorded. The data to be recorded may be data of various types, such as image data, sound data, music data, text data, or the like.

In the image forming apparatus 1 shown in FIG. 1, the mechanism for driving the medium 20, the mechanism for driving the pick up 7 with respect to the medium 20 and the signal processing apparatus which converts the data to be recorded into laser light, and the like, are omitted from the drawing.

Here, a coloring material (photochromic material) is coated onto at least one surface of the medium 20, for example. This photochromic compound is a material having properties whereby it produces a color when struck by ultraviolet light and a particular color is erased when struck by light of a particular wavelength which is absorbed by the compound. For example, it is possible to use photochromic compounds which produce colors of cyan (C), magenta (M) and yellow (Y) upon irradiation of ultraviolet light.

The image forming apparatus 1 forms an image on the surface of the disk-shaped medium 20 by using a coloring material which has been coated onto the surface of the medium 20. The image forming apparatus 1 comprises, as a composition for forming an image on a surface of the medium 20, a color generating unit 2 which causes the coloring material to produce a color, color erasure units 3 to 5 which erase the colors of the coloring material that has been caused to produce a color by the color generating unit 2, and a fixing unit 6 which fixes the color that has been produced, these elements being arranged in this sequence in the direction of rotation of the medium 20.

The color generating unit 2 comprises a light source which emits the wavelength of ultraviolet light when forming an image on a medium 20 which has been coated with a coloring material (photochromic compound) that produces color when struck by ultraviolet light as described above. The wavelength of the light generated by this coloring unit 2 is not limited to being the wavelength of ultraviolet light and is specified in accordance with the characteristics of the coloring material coated onto the medium 20.

Furthermore, the color erasure units 3 to 5 comprise a first color erasure unit 3, a second color erasure unit 4 and a third color erasure unit 5 which erase colors of difference wavelengths, these units being arranged in this order in the direction of rotation of the medium 20.

If using coloring materials including photochromic compounds which produce cyan (C), magenta (M) and yellow (Y) upon irradiation of ultraviolet light, the color erasure units comprise three units, namely, a first color erasure unit 3 which emits R (red) visible light that erases the color of cyan (C), a second color erasure unit 4 which emits G (green) visible that erases the color of magenta (M), and a third color erasure unit 5 which emits B (blue) visible light that erases the color of yellow (Y). By this means, it is possible to carry out color printing. It can be designated as desired which of the first color erasure unit 3 to third color erasure unit 5 will emit visible light of R, G, B frequencies respectively.

The wavelength of the light emitted by the color erasure units 3 to 5 is not limited to the wavelengths of visible light and it is also possible to use infrared light, for example, as specified in accordance with the characteristics of the coloring material coated onto the medium 20.

The fixing unit 6 is provided with a heating source which fixes the colors that have been produced in the coloring material. This heat source may use electric heating wires, a ceramic heater, or a halogen lamp or the like.

The respective operations of color generation, color erasure and fixing are carried out in this sequence, but in respect of the arrangement sequence of the color generating unit 2 and the color erasure units 3 to 5 and the fixing unit 6 when they are disposed in the circular circumferential direction of the medium 20, the sequence of operations does not necessarily have to coincide with the direction of rotation, and these units may be arranged in any desired sequence provided that the operations are carried out in the order: color generation, color erasure and fixing, for each medium.

Figure 2:
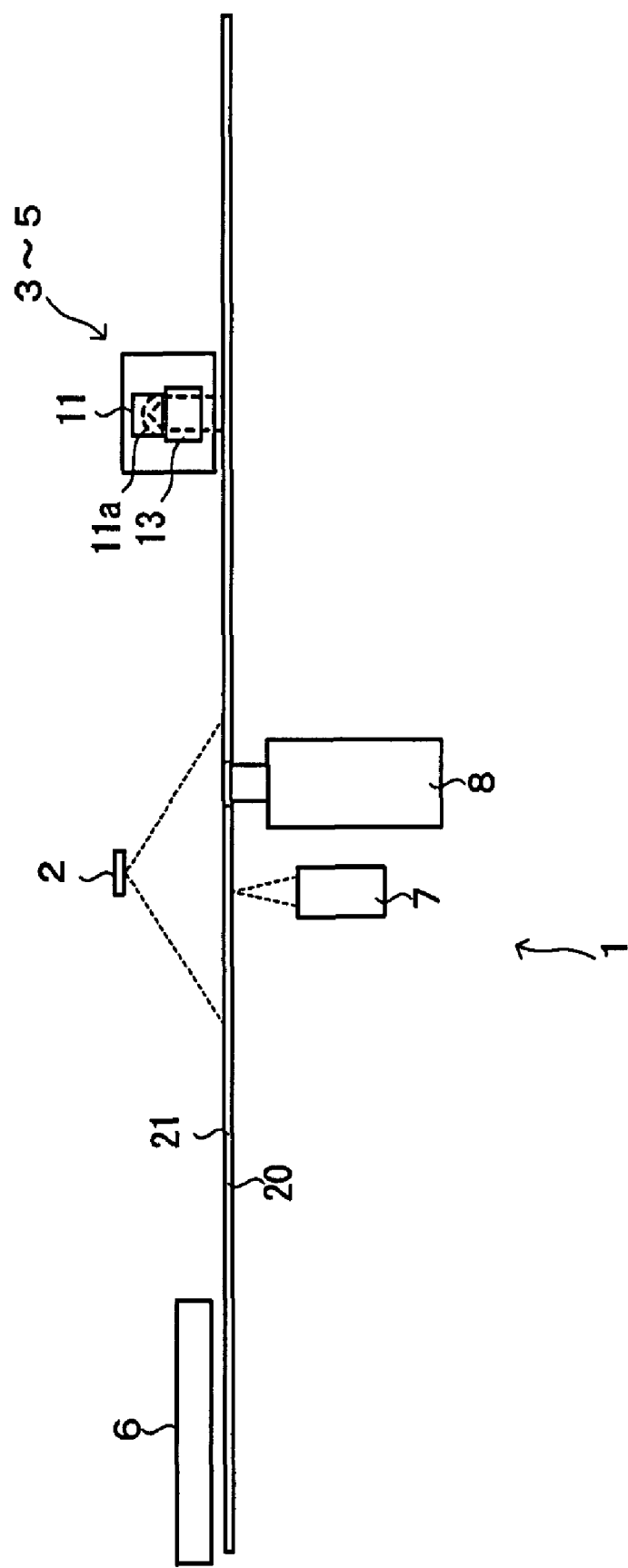
FIG. 2 is an approximate cross-sectional diagram for describing the approximate composition of the image forming apparatus according to the present invention.

FIG. 2 shows an approximate cross-sectional diagram of the image forming apparatus 1 according to the present invention. In FIG. 2, taking the position where the medium 20 is disposed as a boundary, situated to the lower side of this boundary there are an optical pick up 7 which performs data recording by irradiating laser light or the like onto the recording surface of the medium 20 and a rotational drive apparatus 8 which drives the medium 20 to rotate, and situated to the upper side of the boundary there are the color generating unit 2, the color erasure units 3 to 5 and the fixing unit 6 which were described above. The color generating unit 2, the color erasure units 3 to 5 and the fixing unit 6 may be disposed on the same side of the medium 20 as the optical pick up 7. In this case, since a recording surface for recording data is provided on the surface of the medium 20, then the label surface where printing is to be carried out by image formation is formed by using an excluded portion of this recording surface, and the color generating unit 2, the color erasure units 3 to 5 and the fixing unit 6 which are disposed to the lower side are positioned in such a manner that that they irradiate light of respective wavelengths onto the excluded portion of the recording surface.

The color erasure units 3 to 5 comprise a light source 11 and an optical lens 13, for example, a Selfoc lens, in order to focus an image of the light from the light source 11 onto the label surface 21 of the medium 20.

The light source 11 comprises a plurality of light emitting sections 12 such as LED elements arranged in at least one column in the radial direction of the medium 20, thereby forming a line of light. When light is irradiated once using this one-column arrangement, exposure is performed onto the pixels corresponding to one line arranged in the radial direction on the medium 20. The number of pixels in this one line corresponds to the number of LED elements in the light emitting sections 12. The line-shaped arrangement of the light emitting sections 12 is not limited to a single column and may also be formed as a plurality of columns. Furthermore, the light source 11 may be composed so as to comprise a reflective surface 11a in order to use the emitted light in a more efficient manner.

Furthermore, the light emitting sections are not limited to light-emitting bodies which are self-emitting elements, such as the LED elements described above, and they may also use, for example, elements which shield and transmit or reflect light from a light source, as in a liquid crystal shutter.

FIG. 3 shows the relationship between the printed dots when printing is carried out onto the label surface 21 of the medium 20 and the original image data used for this printing operation, in the image forming apparatus according to the present invention. The original image data used for printing is image data that is specified on the basis of a perpendicular coordinates system, a pixel tone value being set for each of the integer coordinates points which are arranged in a lattice configuration. FIG. 3A is an approximate diagram for describing this perpendicular coordinates system image data 200. Here, pixel tone values corresponding to the tonal shading of the image are set for each integer coordinates point of the lattice shape of the perpendicular coordinates system which is specified in terms of an x axis and a y axis that intersect orthogonally at a point of origin (0,0).

The image forming apparatus according to the present invention prints this image data onto a donut-shaped label surface 21 which is provided on a circular disk-shaped medium 20. FIG. 3B shows coordinates points printed onto the donut-shaped label surface 21 of the perpendicular coordinates system image data 200 shown in FIG. 3A. Of the double circles shown in FIG. 3B, the outer circle which has a radius of rmax indicates the outer circumference of the label surface 21 and the inner circle which has a radius of rmin indicates the inner circumference of the label surface 21. The portion enclosed between these double circles is the print region 210, and printing is carried out by using the perpendicular coordinates system image data 200 present inside this print region 210.

FIG. 3C, on the other hand, shows the label surface 21 of the medium 20, a print head 310 which performs printing onto this label surface 21 and printed dots 311. Printing onto the label surface 21 is carried out in synchronism of the position of rotation while the print head 310 and the label surface 21 are caused to rotate relatively with respect to each other. Consequently, the printed dots 311 are formed following a line extending in the radial direction from the center of rotation of the medium 20. Therefore, the arrangement of the printed dots 311 does not coincide with a lattice shape which is arranged in the x and y directions, as is the case of the perpendicular coordinates system image data 200. Accordingly, if the perpendicular coordinates system image data 200 is supplied directly to the print head 310 as raster data, then positional deviation occurs in the image data, leading to deterioration in image quality.

Therefore, the image forming apparatus according to the present invention comprises a function for converting the perpendicular coordinates system image data into image data which is suitable for printing onto the label surface 21 of a circular disk-shaped medium 20 by using a line-shaped print head.

The approximate composition of the image forming apparatus 1 according to the present invention is described below with respect to FIG. 4 to FIG. 6.

Figure 4:
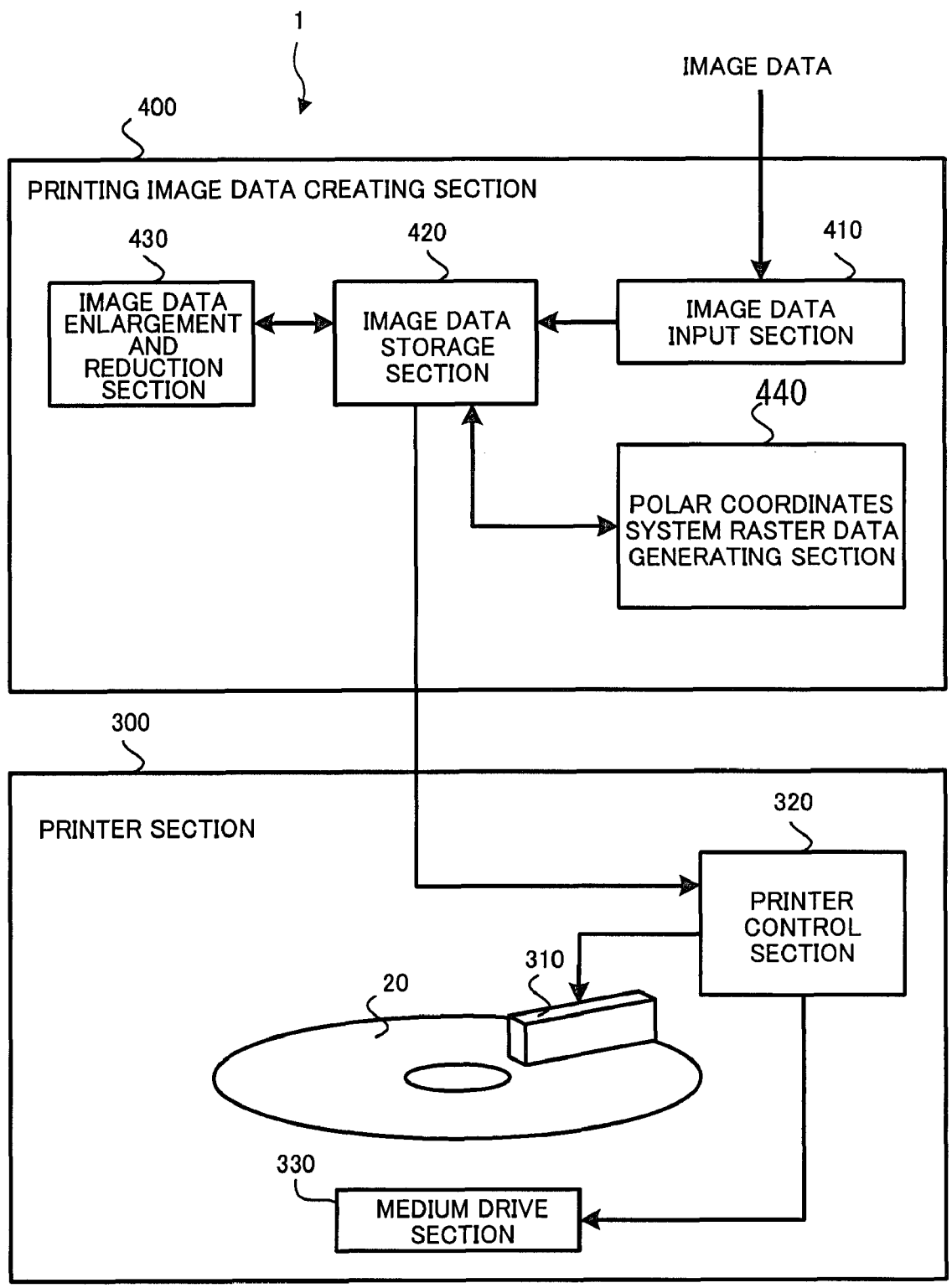
FIG. 4 is a diagram for describing the approximate composition of the image forming apparatus according to the present invention.

FIG. 4 is a diagram showing the approximate composition of the image forming apparatus 1 according to the present invention. In FIG. 4, the image forming apparatus 1 comprises a printer section 300 which performs printing onto the label surface 21 of a circular disk-shaped medium 20, and a printing image data creating section 400 which creates printing image data to be used in printing by the printer section 300.

The printer section 300 comprises a line-shaped head 310 which is arranged in the radial direction of the medium 20 in order to perform printing onto the label surface 21 of the circular disk-shaped medium 20, a medium driving section 330 which drives the medium 20 in rotation, and a print control section 320 which controls the transmission of image data to the head 310 and the driving of the medium drive section 330, and synchronously controls the rotation of the medium 20 and the printing operation performed by the head 310. The control performed by the printer control unit 320 can be achieved by means of a CPU executing a program which specifies the prescribed operations. Polar coordinates system raster data obtained by converting the image data to polar coordinates is input from the printing image data creating section 400, correction processing is applied to this polar coordinates system raster data, and the corrected polar coordinates system raster data is then used to drive printing by the head 310.

The correction processing employed here may be, for example, inner and outer circumference tone correction processing, quantity of light non-uniformity correction processing, and the like. These correction processes are described hereinafter.

On the other hand, the printing image data creating section 400 converts the image data of the perpendicular coordinates system to create image data which is suitable for printing onto the label surface 21 of the circular disk-shaped medium 20 using a line-shaped print head.

The printing image data creating section 400 shown in FIG. 4 comprises an image data input section 410, an image data storage section 420, an image enlargement and reduction section 430, and a polar coordinates system raster data generating section 440.

The image data input section 410 inputs image data from an external source and records same to the image data storage section 420. Here, the input image data is image data for a perpendicular coordinates system, which includes positional data for integer coordinates points in a lattice configuration, and image tone values that have been set for these integer coordinates points. The polar coordinates system raster data generating section 440 converts the image data of the perpendicular coordinates system to polar coordinates, thereby creating polar coordinates system raster data which can be printed by the printer section 300. The image data storage section 420 temporarily stores image data input from an external source, or is used in the calculation processing performed by the polar coordinates system raster data generating section 440 or the image enlargement or reduction section 430.

The image enlargement and reduction section 430 carries out calculations for enlarging or reducing the data size of the image data. This calculation can be carried out, for example, by linear interpolation using a bilinear method, or the like. Here, in order to print at half pitch, for example, the input image data of the perpendicular coordinates system is enlarged and the size of the polar coordinates system raster data created by the polar coordinates system raster data generating section 440 is reduced in accordance with the number of dots in the circumference of the circle.

Polar coordinates system raster data which has been enlarged for printing at half the pitch angle by the image enlargement and reduction section 430, converted to polar coordinates system raster data by the polar coordinates system raster data generating section 440 and then reduced by the image enlargement and reduction section 430 in accordance with the number of dots in the circumference of the circle is supplied to the printer control section 320 of the printer section 300 and is printed onto the label surface 21 of the medium 20. The enlargement process for half pitch printing which is carried out by the image enlargement and reduction section 430 is optional, and it can be omitted when not printing at half pitch.

Figure 5:
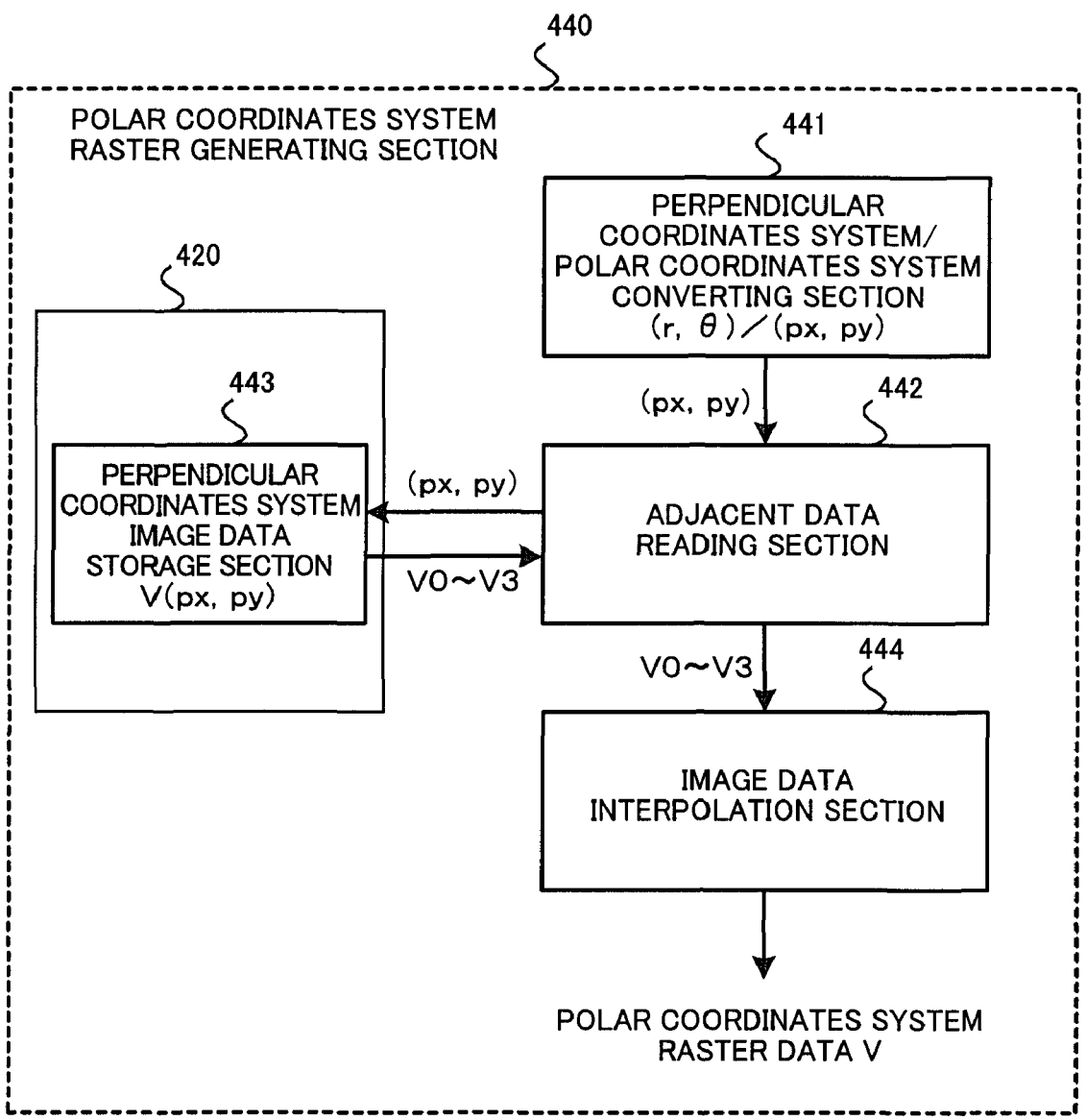
FIG. 5 is a diagram for describing an example of the composition of a polar coordinates system raster data generating section according to the present invention.

FIG. 5 shows one example of the composition of the polar coordinates system raster data generating section 440 on the basis of the respective functions of same.

The polar coordinates system raster data generating section 440 has a function for converting the image data based on the perpendicular coordinates system to polar coordinates and thereby creating polar coordinates system raster data which can be printed by the printer section 300, and it may have a composition comprising a polar coordinates/perpendicular coordinates converting section 441, an adjacent data reading section 442, a perpendicular coordinates system image data storage section 443, and an image data interpolation section 444.

The polar coordinates/perpendicular coordinates converting section 441 converts the coordinates points of a polar coordinates system which are expressed by a radius r and an angle of deviation θ, into coordinates points of a perpendicular coordinates system based on an x coordinate and a y coordinate. By this means, a coordinates point (px, py) based on a perpendicular coordinates system is determined which corresponds to the coordinates point of a dot printed by the head as expressed by (r, θ) in a polar coordinates system on the label surface 21 of the medium 20.

For example, the image data acquired by an imaging device such as a CCD camera is expressed as pixel tone values at coordinates points on a perpendicular coordinates system, and normally the coordinates points (px, py) of this image data on the perpendicular coordinates system are expressed as integers. On the other hand, when a coordinates point (r, θ) on a polar coordinates system is expressed on a perpendicular coordinates system, then the result is a real number which does not necessarily coincide with the integers expressed by the coordinates point (px, py) on the perpendicular coordinates system, and hence the coordinates point (px, py) converted by the polar coordinates/perpendicular coordinates converting section 441 includes positional deviation with respect to the integer coordinates points.

Consequently, a pixel tone value V(x,y) which has been input from an external source and stored in the perpendicular coordinates system image data storage section 443 does not necessarily contain the pixel tone value corresponding to the coordinates point (px, py) converted by the polar coordinates/perpendicular coordinates converting section 441. The perpendicular coordinates system image data storage section 443 may be composed by a temporary storage area included in the image data storage section 420.

Therefore, the adjacent data reading section 442 reads out immediately adjacent data which surrounds the coordinates point (px, py) from the perpendicular coordinates system image data storage section 443, and the image data interpolation section 444 uses the adjacent data thus read out to calculate by interpolation the pixel tone value corresponding to the coordinates point (px, py), thereby generating raster data V which corresponds to a coordinates point (r, θ) on the polar coordinates system.

The interpolation performed by the image data interpolation section 444 may employ linear interpolation using a bilinear method, for example, but it is not limited to a bilinear method and may also employ another interpolation method.

The processing performed by the polar coordinates/perpendicular coordinates converting section 441 in order to determine a coordinates point (px, py) on the perpendicular coordinates system from a coordinates point (r, θ) on the polar coordinates system is carried out by means of the calculation: $px = r \cdot \cos\theta$, $py = r \cdot \sin\theta$, and furthermore if the coordinates points (r, θ) on the polar coordinates system are already known, then it is possible to determine the corresponding coordinates points (px, py) on the perpendicular coordinates system in advance by means of the calculation described above so that the values can be recorded in the form of a table or the like and subsequently read out in sequence.

In this case, if the whole circumference of the medium is divided every 45°, for example, so as to obtain eight segments, then calculation from the polar coordinates system to the perpendicular coordinates system, or creation of a corresponding table, may be carried out for one of these segments and then converted with respect to the whole circumference by appending a sign which corresponds to the angular position of the segment on the circumference of the circle.

By this means, as well as being able to shorten the calculation time, it is also possible to reduce the volume of data stored when the data is stored in the form of a table.

Next, an example of the composition of the printer control section 320 provided in the printer section 300 is described with reference to FIG. 6. Here, of the functions provided in the printer control section 320, this explanation centers on the composition for carrying out correction processing when printing by using polar coordinates system raster data which has been created by the printing image data creating section 400.

Figure 6:
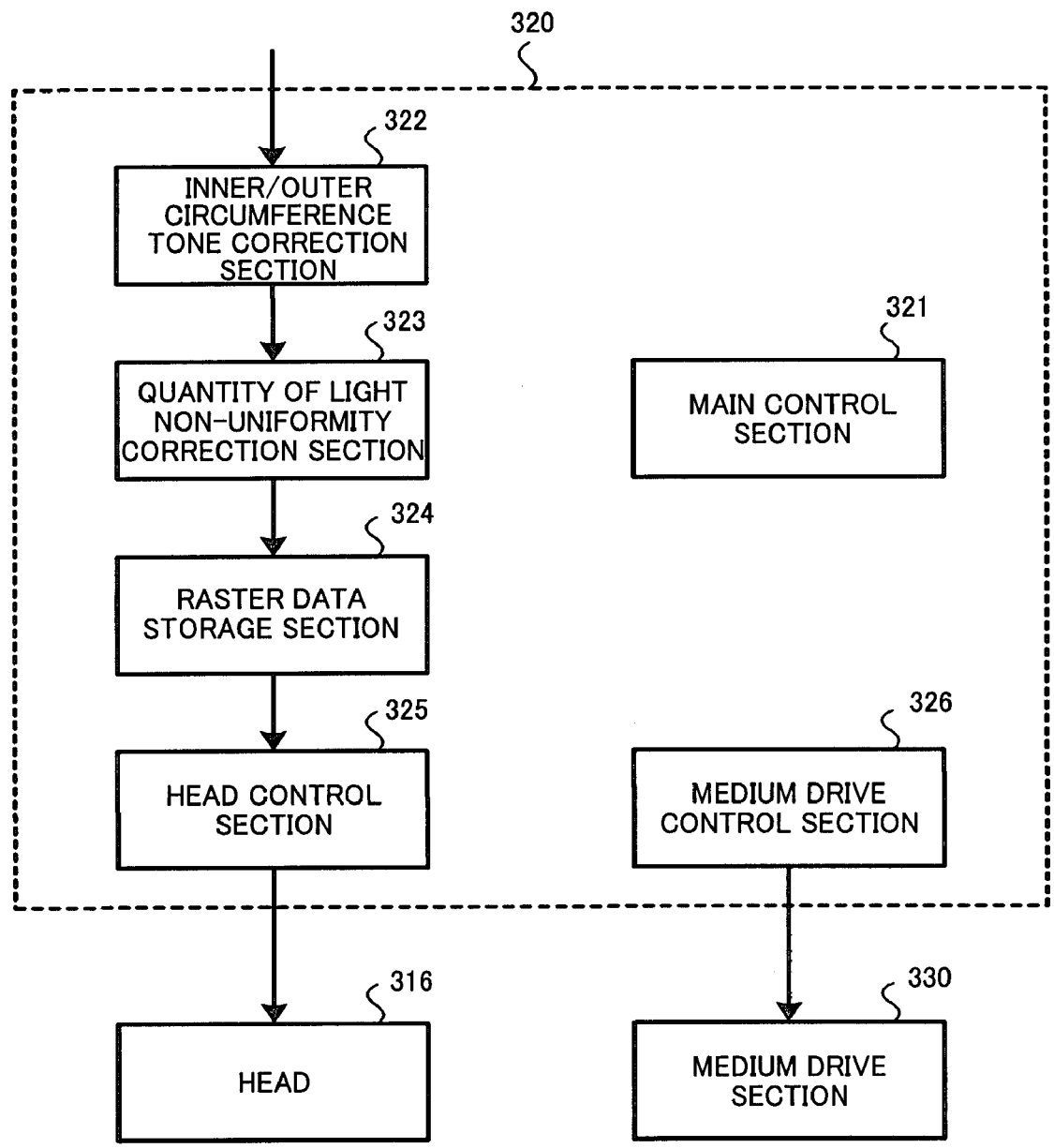
FIG. 6 is a diagram for describing an example of the composition of a printer control unit provided in a printer unit according to the present invention.

In FIG. 6, the printer control section 320 comprises an inner and outer circumference tone correction section 322 which inputs the polar coordinates system raster data created by the printing image data creating section 400 and corrects for bias in the tones caused by the fact that the printed dots are mutually overlapping in the inner circumference portion and the outer circumference portion of the medium, a quantity of light non-uniformity correction section 323 which corrects for non-uniformity of printing caused by deviation in quantity of light emitted by the light emitting sections of the optical unit, a temporary storage section 324 which temporarily stores the corrected polar coordinates system raster data, a head control section 325 which controls the driving of the head 316 by using the corrected polar coordinates system raster data which has been stored in the temporary storage section 324, a medium drive control section 326 which controls the medium drive section 330 which drives the medium so as to rotate, and a main control section 321 which controls the whole of the printer control sections.

The main control section 321 synchronously controls the head control unit 325 and the medium drive control section 326 in such a manner that the head 316 prints at the prescribed position of rotation on the medium.

Figure 7:
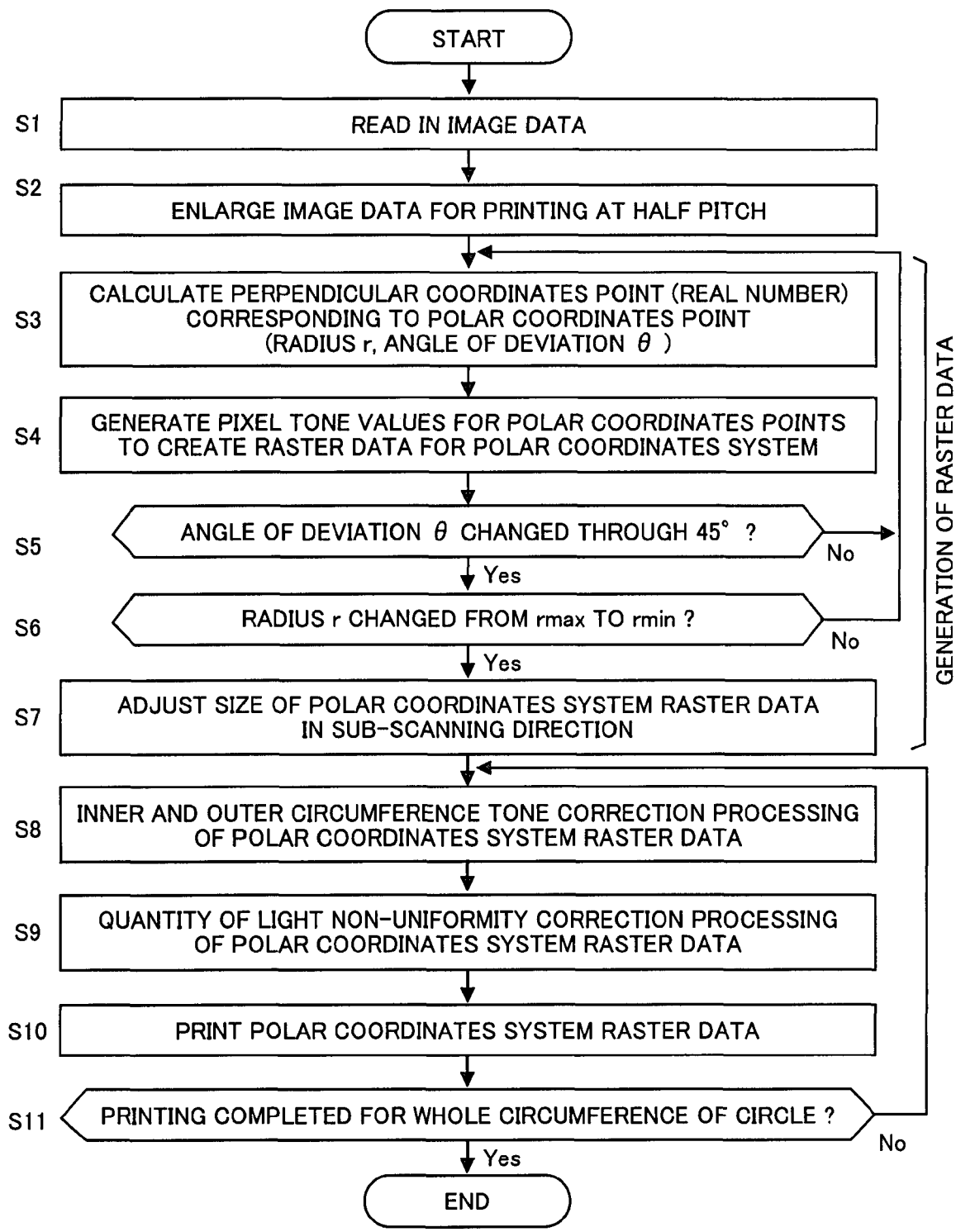
FIG. 7 is a flowchart for describing an example of the operation of a printing image data creating section provided in the image forming apparatus according to the present invention.
Figure 9:
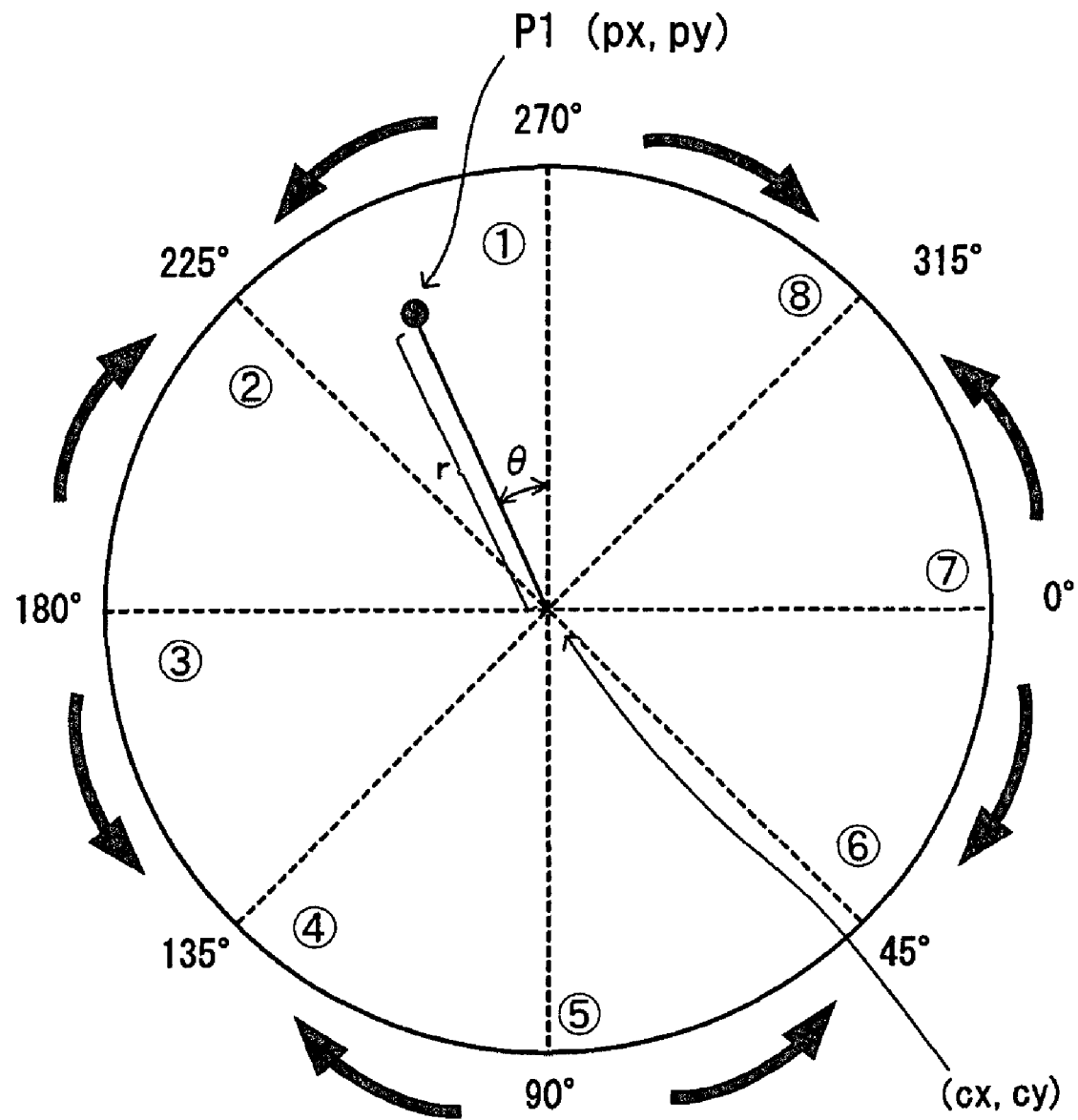
FIG. 9 is a diagram for describing segments set in the printing image data creation process according to the present invention.
Figure 17A:
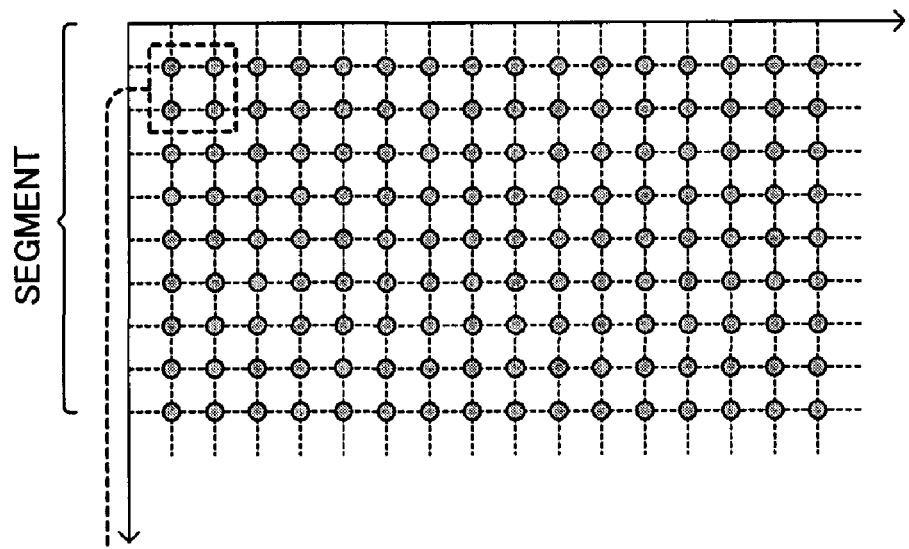
FIGS. 17A and 17B are diagrams for describing an adjustment process for harmonizing the size of the polar coordinates system raster data in the sub-scanning direction, with the dots in the circular circumference, according to the present invention.
Figure 17B:
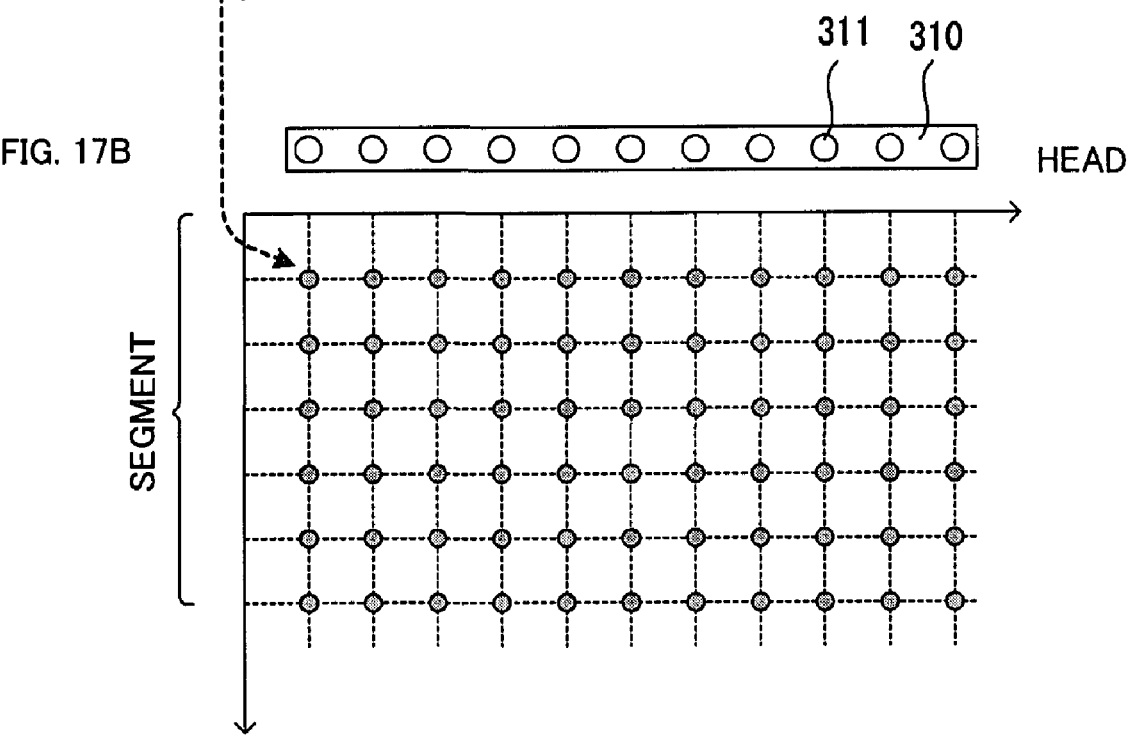

Next, an example of the operation of the printing image data creating section provided in the image forming apparatus according to the present invention will be described to the flowchart in FIG. 7 and the illustrative diagrams in FIG. 8 to FIG. 17. FIGS. 8A and 8B are diagrams for describing the relationship between the perpendicular coordinates system image data and polar coordinates system image data; FIG. 9 and FIG. 10 are diagrams for describing segments which are set in the printing image data creation process; FIGS. 11A and 11B and FIGS. 12A and 12B are diagrams for describing real number coordinates points in a perpendicular coordinates system which correspond to coordinates points in a polar coordinates system; FIGS. 13 to 15 are diagrams for describing a method of determining real number coordinates points in a perpendicular coordinates system which correspond to coordinates points in a polar coordinates system, by means of a bilinear method; FIGS. 16A to 16E are diagrams for describing the setting of image data in a boundary portion between adjacent segments; and FIGS. 17A and 17B are diagrams for describing an adjustment process for harmonizing the size of the polar coordinates system raster data in the sub-scanning direction (the number of data elements in the circumferential direction), with the dots in the circular circumference.

The description given below follows the flowchart in FIG. 7. The flowchart in FIG. 7 includes operations which are performed by the printing image data creating section 400 shown in FIG. 4 and operations which are performed by the printer section 300. The steps S1 to S7 in the flowchart are operations which are performed by the printing image data creating section 400 and the steps S8 to S11 are operations which are performed by the printer section 300.

The printing image data creating section 400 firstly reads in image data. This image data is perpendicular coordinates system image data which has pixel tone values at integer coordinates points which are arranged in a matrix configuration in the x and y directions. This perpendicular coordinates system image data may be, for example, image data which has been captured by an imaging apparatus, such as a CCD camera or the like (S1).

Depending on the number of pixels in the imaging apparatus, printing may be performed at a pitch of one half of a pixel in order to enhance the quality obtained from printing. In order to print at half the pitch angle in this way, image processing is carried out in order to enlarge the image data by interpolating the image data between pixels. This image processing can be carried out by image enlargement performed by the image enlargement and reduction section 430. This image enlargement processing can be performed, for example, by calculating the central value of adjacent image data by means of an interpolation process using a bilinear method, or the like (S2).

Next, polar coordinates system image data is created from the perpendicular coordinates system image data by means of the steps S3 to S7.

A coordinates point in the polar coordinates system is expressed in terms of a radius r and an angle of deviation θ. Printing is carried out onto the label surface 21 of the disk-shaped medium 20 while performing relative rotational movement of a line head which is arranged in the radial direction. Consequently, it is suitable that the image data printed by the head should be polar coordinates system image data which is expressed as a radius r and an angle of deviation θ. On the other hand, the input image data is image data based on a perpendicular coordinates system which is specified for integer coordinates point arranged in a matrix configuration in x and y directions, and therefore the pixel tone values specified for the integer coordinates points of this perpendicular coordinates system cannot be used directly in the line head.

FIGS. 8A and 8B show the relationship between the polar coordinates system image data 500 and the perpendicular coordinates system image data 200. FIG. 8A shows perpendicular coordinates system image data 200 in which pixel tone values are set for integer coordinates points that are arranged in a matrix configuration in the x and y directions, and it shows only the integer coordinates points which are present in the portion corresponding to the print region 210 on the medium 20. For each of these integer coordinates points, a pixel tone value corresponding to that position is specified, but since these integer coordinates positions do not necessarily coincide with the positions of the dots printed by the line head, then it is not possible to use the pixel tone values set for the integer coordinates points directly, without modification. Therefore, in order to determine the relationship between the coordinates points of the perpendicular coordinates system image data 200 and the coordinates points of the polar coordinates system image data 500, the real number coordinates points on the perpendicular coordinates system which correspond to the coordinates points of the polar coordinates system are calculated (S3), the integer coordinates points which are actually set in the perpendicular coordinates system and which are located adjacently to the real number coordinates points thus calculated are determined, and the pixel tone values for the real number coordinates points corresponding to the polar coordinates system are determined by using the pixel tone values which have been set for these adjacently located integer coordinates points.

FIG. 8B shows polar coordinates image data where the radius r is set in the direction of the horizontal axis and the angle of deviation θ is set in the direction of the vertical axis. Furthermore, the radius r on the horizontal axis is between the radius rmax of the outermost circumference and the radius rmin of the innermost circumference of the print region 210 of the medium, and the angle of deviation θ on the vertical axis is shown for the respective segments 1 to 8 which are obtained by dividing the whole circumference every 45° (the segments are indicated by the ringed numerals in FIG. 8B). Moreover, the direction of the radius r from the radius rmax of the outermost circumference towards the radius rmin of the innermost circumference is taken to be the main scanning direction, and the direction of the angle of deviation θ is taken to be the sub-scanning direction. The magnitude of the angle of deviation θ is set in the sub-scanning direction for each of the respective segments.

FIG. 9 is a diagram for describing the segments. In FIG. 9, the angular position on the right-hand end of the circle is taken to be 0°, and the angle is specified in a clockwise direction. In the segments determined in the present invention, adjacent segments are set to have mutually opposite directions of the angle of deviation θ. For example, segment 1 corresponds to the angle range from 225° to 270°, and the direction from 270° to 225° (counter-clockwise direction) is set as the angle of increase of the angle of deviation θ, and segment 2 which is adjacent to this segment 1 in the counter-clockwise direction corresponds to the angle range from 180° to 225°, and the direction from 180° to 225° (clockwise direction) is set as the direction of increase of the angle of deviation θ. On the other hand, segment 8 which is adjacent to segment 1 in the clockwise direction corresponds to the angle range from 270° to 315°, and the direction from 270° to 315° (clockwise direction) is set as the direction of increase in the angle of deviation θ. The other adjacent segments are set to have mutually opposite directions of the angle of deviation θ, in a similar fashion.

By setting the respective segments in this way, in the conversion of the coordinates positions from the polar coordinates system to the perpendicular coordinates system, by specifying angle ranges in units of 45°, it is possible to relate the coordinates positions between respective segments so that they have the same absolute values and only have different signs. By adopting this relationship, in calculation or conversion using a table from a polar coordinates system to a perpendicular coordinates system, by appending a sign which is specified in accordance with the angular position of the segment on the circumference of the circle, it is possible to make the angles set within each of the segments share positions having the same absolute value, and hence the calculation time and the storage volume can be reduced.

FIG. 10 shows the relationship between the coordinates values of the respective segments. Here, if the central position of the medium is represented by (cx, cy) in the perpendicular coordinates system, then the coordinates point P1 (px1, py1) of the perpendicular coordinates system in the first segment (the region indicated by the ringed numeral (1) in FIGS. 8A and 8B and FIG. 9) is represented by (cx−y, cy−x). Taking the radius of the medium to be r (rmin≦r≦rmax) and taking the angle of deviation within the segment to be θ (0° to 45°), then x is (r·cos θ) and y is (r·sin θ).

Similarly, the coordinates point P2 (px2, py2) of the perpendicular coordinates system in the second segment (the region indicated by the ringed numeral (2) in FIGS. 8A and 8B and FIG. 9) is represented by (cx−x, cy−y), the coordinates point P3 (px3, py3) of the perpendicular coordinates system in the third segment (the region indicated by the ringed numeral (3) in FIGS. 8A and 8B and FIG. 9) is represented by (cx−x, cy+y), the coordinates point P4 (px4, py4) of the perpendicular coordinates system in the fourth segment (the region indicated by the ringed numeral (4) in FIGS. 8A and 8B and FIG. 9) is represented by (cx−y, cy+x), the coordinates point P5 (px5, py5) of the perpendicular coordinates system in the fifth segment (the region indicated by the ringed numeral (5) in FIGS. 8A and 8B and FIG. 9) is represented by (cx+y, cy+x), the coordinates point P6 (px6, py6) of the perpendicular coordinates system in the sixth segment (the region indicated by the ringed numeral (6) in FIGS. 8A and 8B and FIG. 9) is represented by (cx+x, cy+y), the coordinates point P7 (px7, py7) of the perpendicular coordinates system in the seventh segment (the region indicated by the ringed numeral (7) in FIGS. 8A and 8B and FIG. 9) is represented by (cx+x, cy−y), and the coordinates point P8 (px8, py8) of the perpendicular coordinates system in the eighth segment (the region indicated by the ringed numeral (8) in FIGS. 8A and 8B and FIG. 9) is represented by (cx+y, cy−x).

Next, raster data on a polar coordinates system is created by generating pixel tone values which are equivalent to the corresponding real number coordinates points on the polar coordinates system calculated at step S3 which was described above.

Figure 11B:
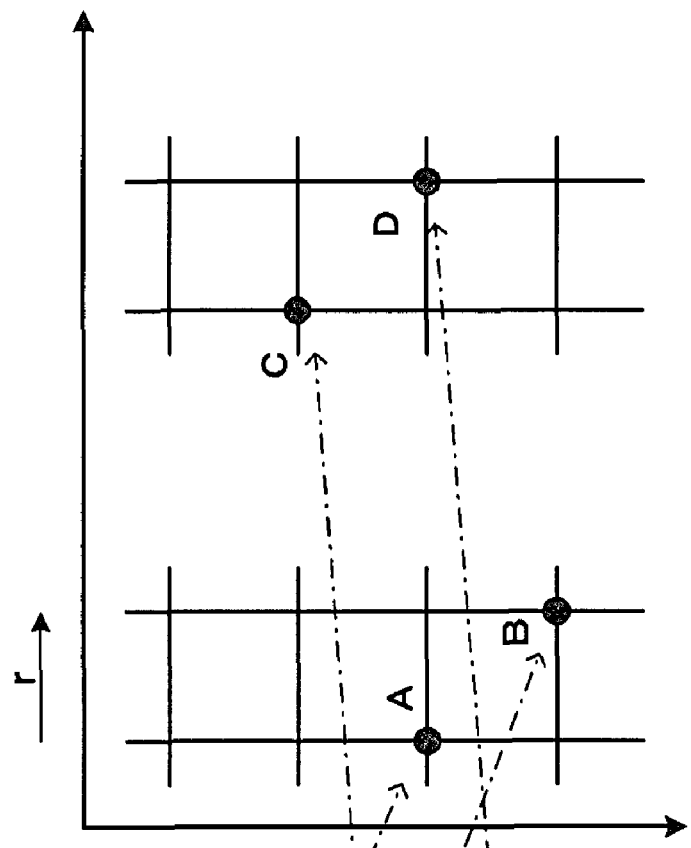
FIGS. 11A and 11B are diagrams for describing real number coordinates points in a perpendicular coordinates system which correspond to coordinates points in a polar coordinates system according to the present invention.
Figure 11A:
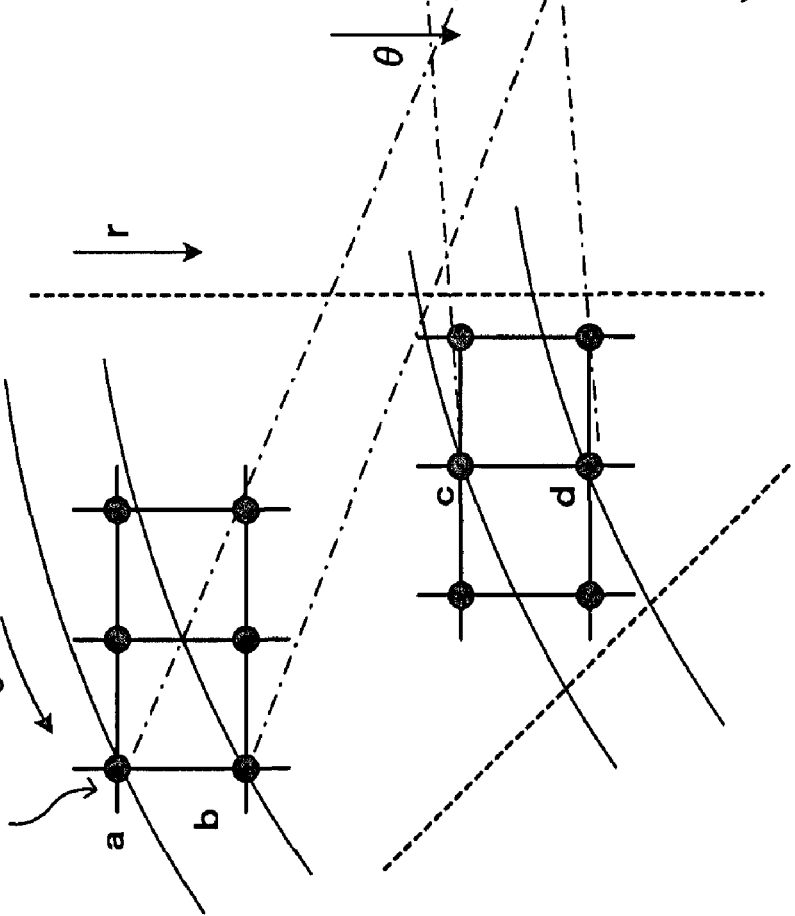

FIGS. 11A and 11B show a case where the coordinates point (r, θ) of the polar coordinates system has been converted to a perpendicular coordinates system, and the coordinates point in the perpendicular coordinates system thus obtained is present amongst the points which are actually set in the perpendicular coordinates system.

For example, these diagrams show a case where the coordinates points obtained by converting the coordinates points A, B, C, D of the polar coordinates system (FIG. 11B) to a perpendicular coordinates system are present amongst the integer coordinates points which are actually set in the perpendicular coordinates system. FIG. 11A shows a case where the integer coordinates points a, b, c, d are present in respect of coordinates points which correspond to the coordinates points A, B, C, D of the polar coordinates system. In this case, it is possible to use the pixel tone values set for the corresponding integer coordinates points a, b, c, d in the perpendicular coordinates system, as the pixel tone values of the coordinates points A, B, C, D of the polar coordinates system.

Figure 12B:
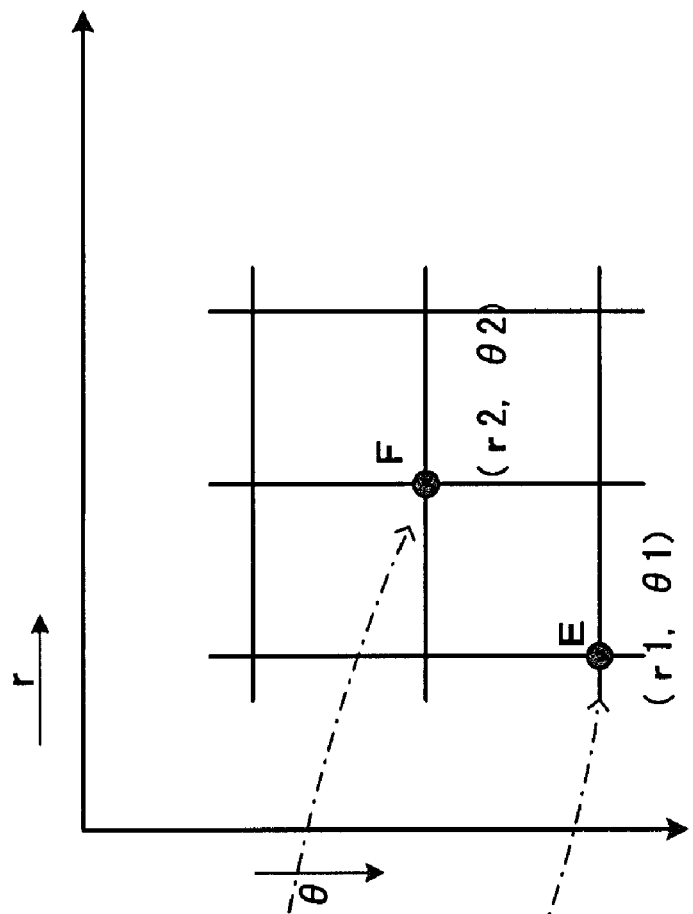
FIGS. 12A and 12B are diagrams for describing real number coordinates points in a perpendicular coordinates system which correspond to coordinates points in a polar coordinates system according to the present invention.
Figure 12A:
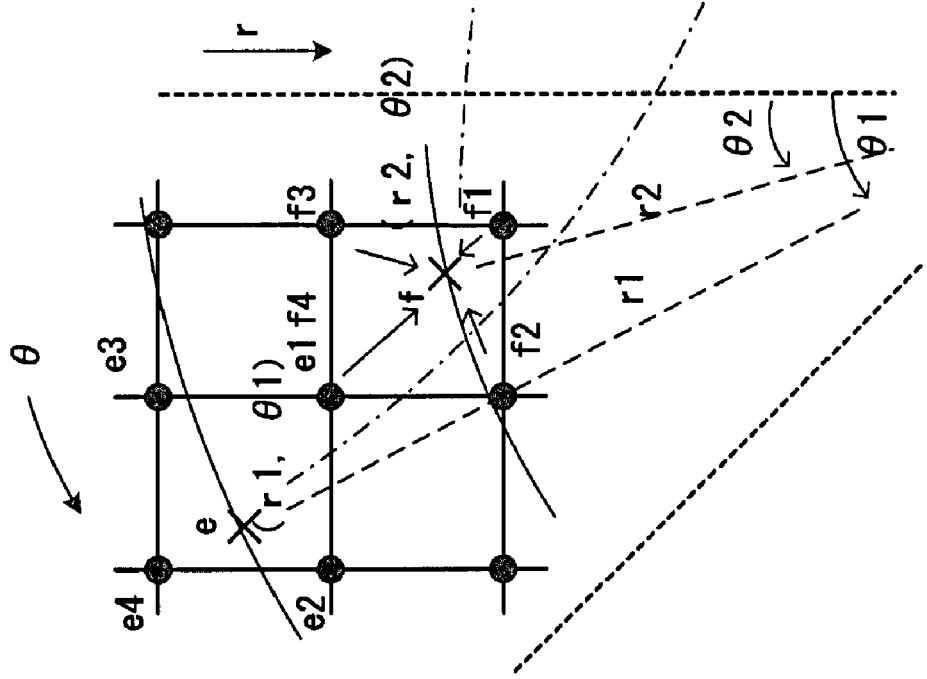
Figure 13:
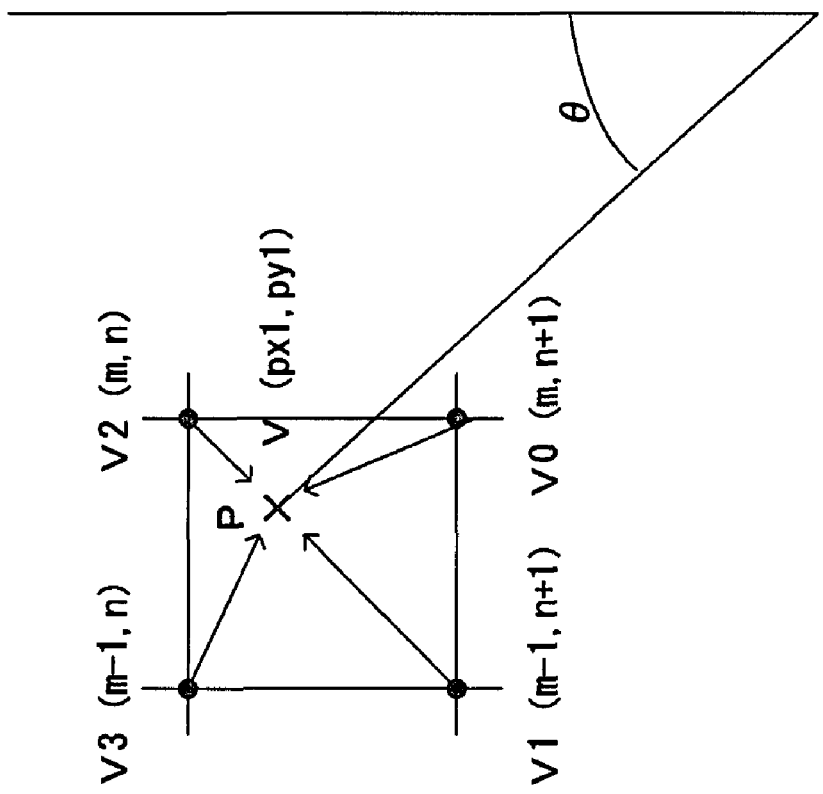
FIG. 13 is a diagram for describing a method of determining real number coordinates points in a perpendicular coordinates system which correspond to coordinates points in a polar coordinates system according to the present invention, by means of a bilinear method.

On the other hand, FIGS. 12A and 12B show a case where the coordinates point corresponding to the perpendicular coordinates system obtained when the coordinates point (r, θ) of the polar coordinates system is converted to a perpendicular coordinates system is not present amongst the integer coordinates points which are set in the perpendicular coordinates system.

For example, the real number coordinates points e, f (FIG. 12A) obtained by converted the coordinates points E, F (FIG. 12B) of the polar coordinates system to the perpendicular coordinates system are not present amongst the integer coordinates points which are actually set in the perpendicular coordinates system.

FIG. 12A shows a case where the integer coordinates points e1, e2, e3, e4 are present in the vicinity of the real number coordinates point e which corresponds to the polar coordinates system, and the integer coordinates points f1, f2, f3, f4 are present in the vicinity of the real number coordinates point f which corresponds to the polar coordinates system. In this case, the pixel tone value of the coordinates point E of the polar coordinates system is determined by interpolation using the pixel tone values of the integer coordinates points e1, e2, e3, e4 which are located in the vicinity of the real number coordinates point e of the perpendicular coordinates system. Furthermore, the pixel tone value of the coordinates point F of the polar coordinates system is determined by interpolation using the pixel tone values of the integer coordinates points f1, f2, f3, f4 which are located in the vicinity of the real number coordinates point f of the perpendicular coordinates system.

The method of determining a pixel tone value in the polar coordinates system by interpolation using the pixel tone values of integer coordinates points located in the vicinity of the corresponding real number coordinates point, in the perpendicular coordinates system, will be described with reference to FIG. 13.

FIG. 13 shows a real number coordinates points in a perpendicular coordinates system. Here, the point P (px1, py1) shows the real number coordinates point which corresponds in the perpendicular coordinates system to the coordinates point (r, θ) of the polar coordinates system. Here, the integer coordinates points (m, n+1), (m−1, n+1), (m, n), (m−1, n) for which pixel tone values have actually been set in the perpendicular coordinates system are situated in the range in the vicinity of the point P (px1, py1), and the pixel tone values of the respective integer coordinates points are V0, V1, V2 and V3.

If the pixel tone value V of the point P (px1, py1) is calculated by linear interpolation using a bilinear method based on these four adjacently positioned integer coordinates points, then it can be represented by the following equation:

$$V=(1.0-\Delta y)(V0((1.0-\Delta x)+(V2\Delta x)+\Delta y(V1(1.0-\Delta x)+V3\Delta x).$$

Here, m is the real part of the x coordinate px, which is expressed by int[px], and n is the real part of the y coordinate py, which is expressed by int[py]. The square brackets used here represent conversion of a real number to an integer, which is achieved by discarding any fractions and rounding down to the nearest whole number. Furthermore, Δx is the fractional part of the perpendicular coordinate x calculated by r·cos θ, and Δy is the fractional part of the perpendicular coordinate y calculated by r·sin θ.

By means of the equation stated above, the pixel tone value of the point (r, θ) on the polar coordinates system can be calculated by linear interpolation using the pixel tone values assigned to four integer coordinates points located adjacently to the corresponding real number coordinates point on the perpendicular coordinates system (S4).

Next, the calculation of the four adjacently located integer coordinates points which are to be used in the calculation of the pixel tone value in the bilinear method described above will be explained with reference to FIGS. 14A and 14B.

Figure 14A:
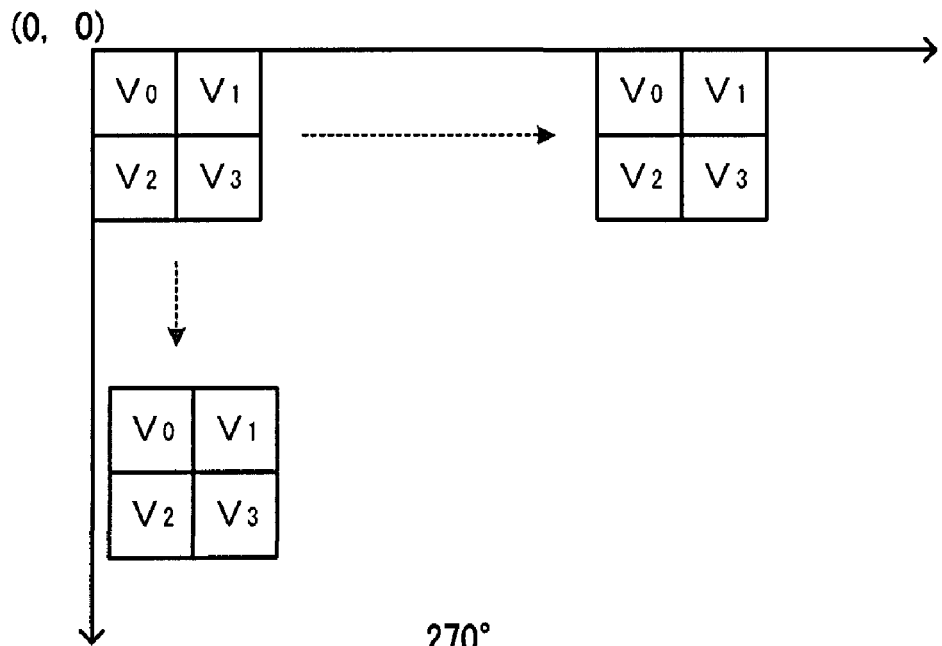
FIGS. 14A and 14B are diagrams for describing a method of determining real number coordinates points in a perpendicular coordinates system which correspond to coordinates points in a polar coordinates system according to the present invention, by means of a bilinear method.

FIG. 14A shows a case where the four adjacently located integer coordinates points to be used in the calculation of the pixel tone value in the bilinear method are derived in the perpendicular coordinates system. In the perpendicular coordinates system, normally, the four adjacently located integer coordinates points are derived according to the same arrangement sequence following the x direction and the y direction. In this case, the integer coordinates points on the perpendicular coordinates system have integer coordinates values and the four adjacently located coordinates points are arranged with respect to a common perpendicular coordinates system; therefore, even if the integer coordinates points are derived according to the same arrangement sequence, the error contained in the interpolation process will be the same.

On the other hand, the interpolation according to the present invention uses real number coordinates values which are calculated in the polar coordinates system in a region obtained by dividing the full circumference into eight segments of 45° each. It was discovered that if a bilinear method is used by selecting four adjacent points in the arrangement sequence in the same x and y directions, similarly to the perpendicular coordinates system, in these eight segments, then the error contained in the interpolation process becomes greater.

Therefore, the main scanning direction (the direction of the radius r in each segment) is made to correspond to the y axis direction of the perpendicular coordinates system, and the sub-scanning direction (the direction of the angle of deviation θ in each segment) is made to correspond to the x axis direction of the perpendicular coordinates system, and the pixel tone value of the corresponding real number coordinates point is interpolated using the pixel tone values assigned to the four integer coordinates points which surround the corresponding real number coordinates point on the polar coordinates system.

Figure 14B:
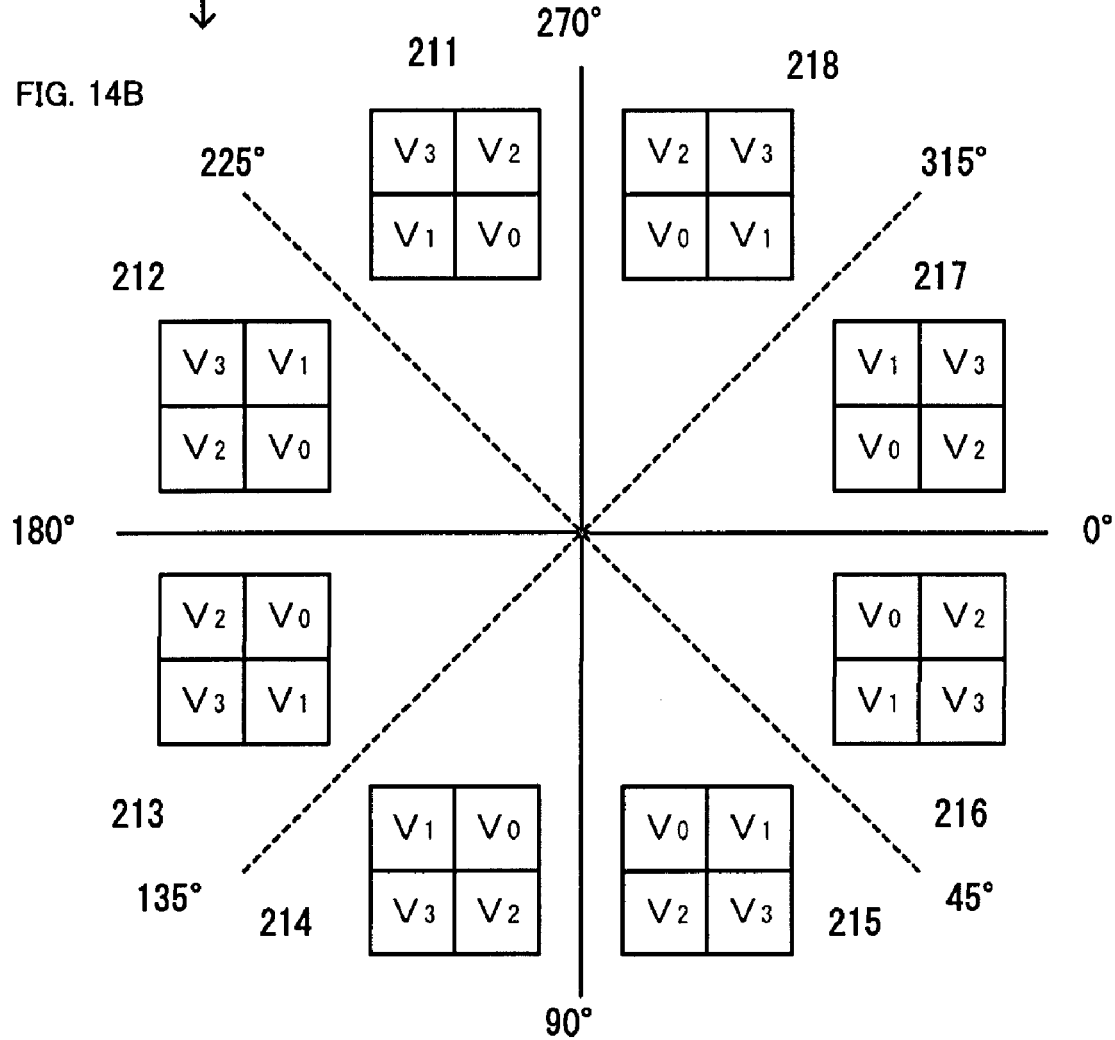

FIG. 14B shows an approximate diagram for describing this arrangement sequence and FIG. 15 shows this arrangement sequence in the form of a table. For example, in the first segment 211 which is set in the angle range of 225° to 270°, an arrangement sequence is adopted in which the direction in which the angle of deviation θ decreases in the sub-scanning direction is made to correspond to the x axis direction of the perpendicular coordinates system, and the main scanning direction is made to correspond to the y axis direction of the perpendicular coordinates system. By using the aforementioned arrangement sequences for the coordinates points used for the bilinear method, it is possible to reduce the error contained in the interpolation process.

Raster data based on the polar coordinates system is generated by step S4 described above, progressively in the sub-scanning direction with respect to the angle of deviation θ of each segment through the 45° angle range of the segment (S5), and progressively in the main scanning direction from a radius r of rmax to rmin in each segment (S6).

Next, the size of the generated raster data in the sub-scanning direction is adjusted. This adjustment of the size in the sub-scanning direction includes adjustment to coincide with the number of printed dots in the circumferential direction.

Firstly, the adjustment of the raster data in the boundary sections between adjoining segments will be described.

The raster data of the respective segments is generated respectively for each of the eight segments, and therefore the respective segments will each possess pixel tone values in the boundary sections between adjoining segments. If printing is carried out using the raster data belonging to each of these segments, then double printing will be performed in the boundary sections, leading to deterioration of the printing quality.

Therefore, the image enlargement and reduction unit 430 reduces the coordinates points of the boundary sections between adjoining segments so as to eliminate overlapping in the boundaries. FIGS. 16A to 16E are diagrams for illustrating the reduction in the coordinates points in a boundary section. FIG. 16A shows integer coordinates points of the portion where the first segment 211 adjoins with the second segment 212, and FIG. 16B shows the arrangement of raster data calculated by interpolation from these integer coordinates points. Furthermore, FIG. 16C shows the integer coordinates points of the portion where the second segment 212 adjoins with the first segment 211, and FIG. 16D shows the arrangement of raster data calculated by interpolation from these integer coordinates points. The raster data belonging to these respective segments each have pixel tone values for the same main scanning positions in the boundary section. The image enlargement and reduction unit 430 reduces the two sets of pixel tone values relating to the same main scanning positions to only one set of pixel tone values.

Next, the adjustment for harmonizing the raster data with the number of printed dots in the circumferential direction will be described. The number of elements of raster data in the sub-scanning direction which are generated from the image data does not necessarily coincide with the number of printed dots that are formed within each segment, and therefore it is necessary to harmonize the number of elements of raster data in the sub-scanning direction with the number of printed dots.

FIGS. 17A and 17B show an example of reducing the number of elements of raster data in the sub-scanning direction in order to harmonize with the number of printed dots. FIG. 17A shows the data arrangement of the raster data and FIG. 17B shows the arrangement of printed dots which are printed by the head. In the example shown here, a plurality of raster data corresponding to the arrangement of printed dots are selected and the number of data elements is adjusted by linear interpolation using a bilinear method, or the like, on the basis of the selected raster data (S7).

Next, the print unit carries out inner and outer circumference tone correction processing (S8) and correction of non-uniformities in the light quantity (S9) on the raster data based on the polar coordinates system thus obtained, and then carries out a printing process (S10). Printing is performed onto the medium by implementing the processes S8 to S10 in respect of the whole of the circular circumference (S11).

Figure 18:
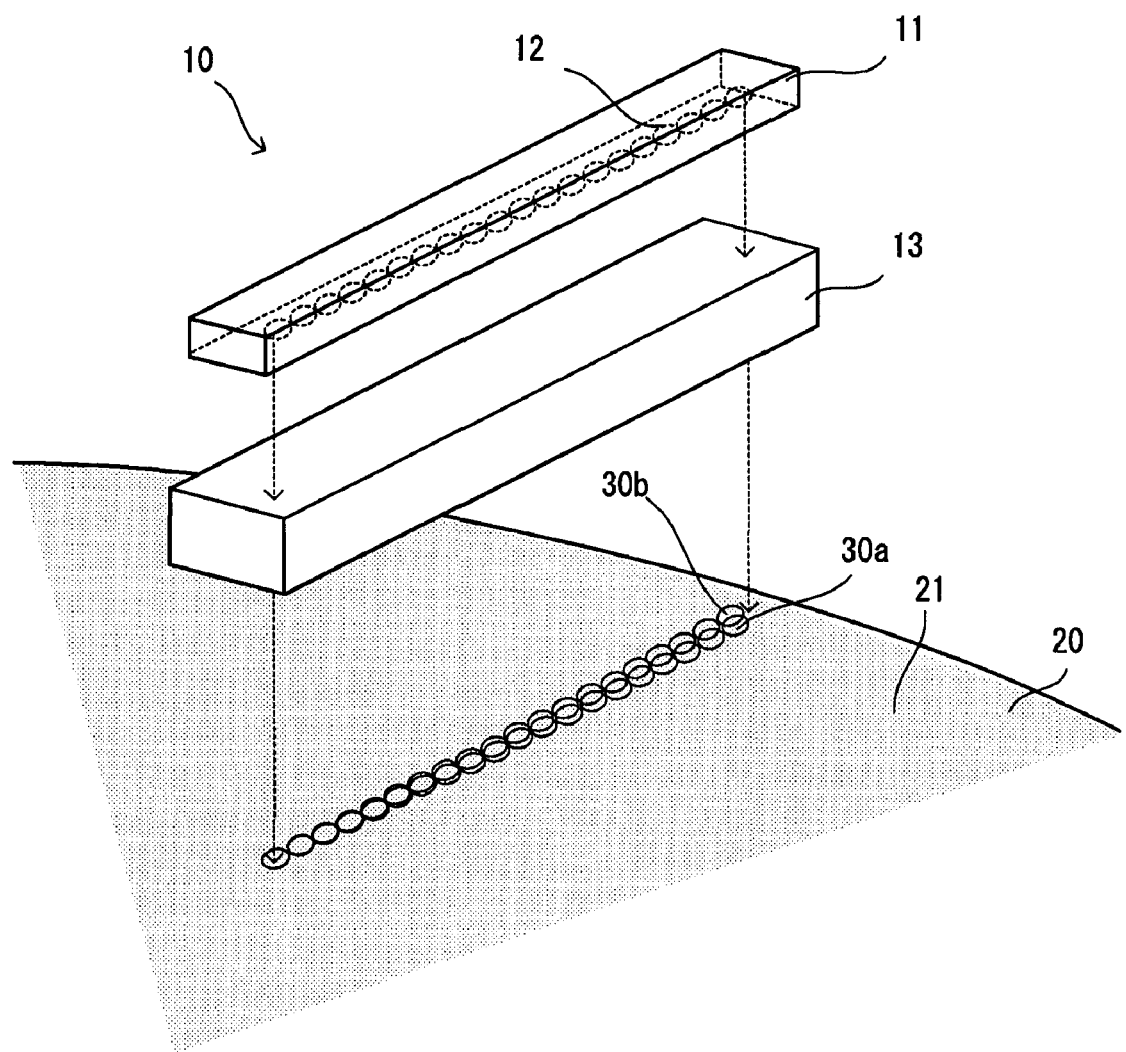
FIG. 18 is a diagram for describing an example of the composition of an optical unit which constitutes a color erasure unit provided in the image forming apparatus according to the present invention.

Below, an example of the composition of the optical unit 10 which constitutes the color erasing unit provided in the image forming apparatus according to the present invention will be described with reference to FIG. 18. FIG. 18 is a perspective diagram for showing one example of the composition of an optical unit 10, and it is divided into respective compositional parts.

Similarly to the illustration given in FIG. 2, the optical unit 10 according to this compositional example comprises a light source 11 and an optical lens 13. This optical unit 10 is fixed in position above the label surface 21 of the medium 20 when set in place. The light emitted by the respective light emitting sections of the light source 11 is irradiated onto the label surface 21 via the optical lens 13.

The respective light emitting sections 12 of the optical unit 10 provided in this compositional example expose all of the pixels on the medium 20 while partially overlapping the pixels which are mutually adjacent in the circumferential direction of rotation. In one light irradiating action, the light emitting sections 12 of the optical unit 10 expose pixels 30 in one line which is aligned in the radial direction on the medium 20. By repeating this light exposure in synchronism with the rotation of the medium 20, an image is formed on the label surface 21 of the medium 20.

In the light exposure which is carried out in synchronism with the rotation of the medium 20, the pixels 30a and 30b which are mutually adjacent in the circumferential direction of rotation are exposed in a partially overlapping fashion. In this case, since light exposure is carried out in such a manner that a portion of the pixels 30a and the pixels 30b which are adjacent in the circumferential direction of rotation are mutually overlapping, at least in the case of the pixels at the outermost circumference, then this means that a portion of the pixels 30a and the pixels 30b which are mutually adjacent in the circumferential direction of rotation also overlap with each other in the case of the pixels on the inner circumferential side as well. By this means, the occurrence of unexposed areas between the adjacent pixels is prevented, and hence the occurrence of incomplete solid filled portions can be eliminated.

Figure 19B:
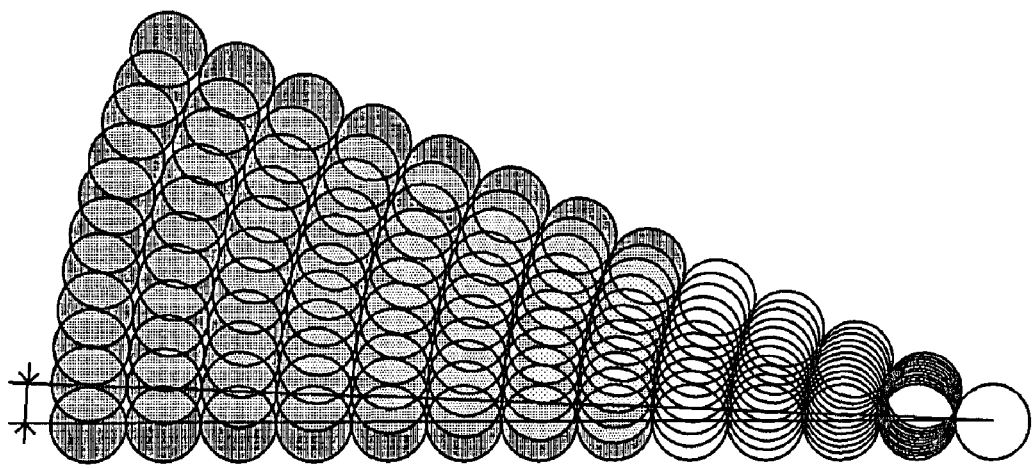
FIGS. 19A and 19B are diagrams for describing overlap in exposure between mutually adjacent pixels.
Figure 19A:
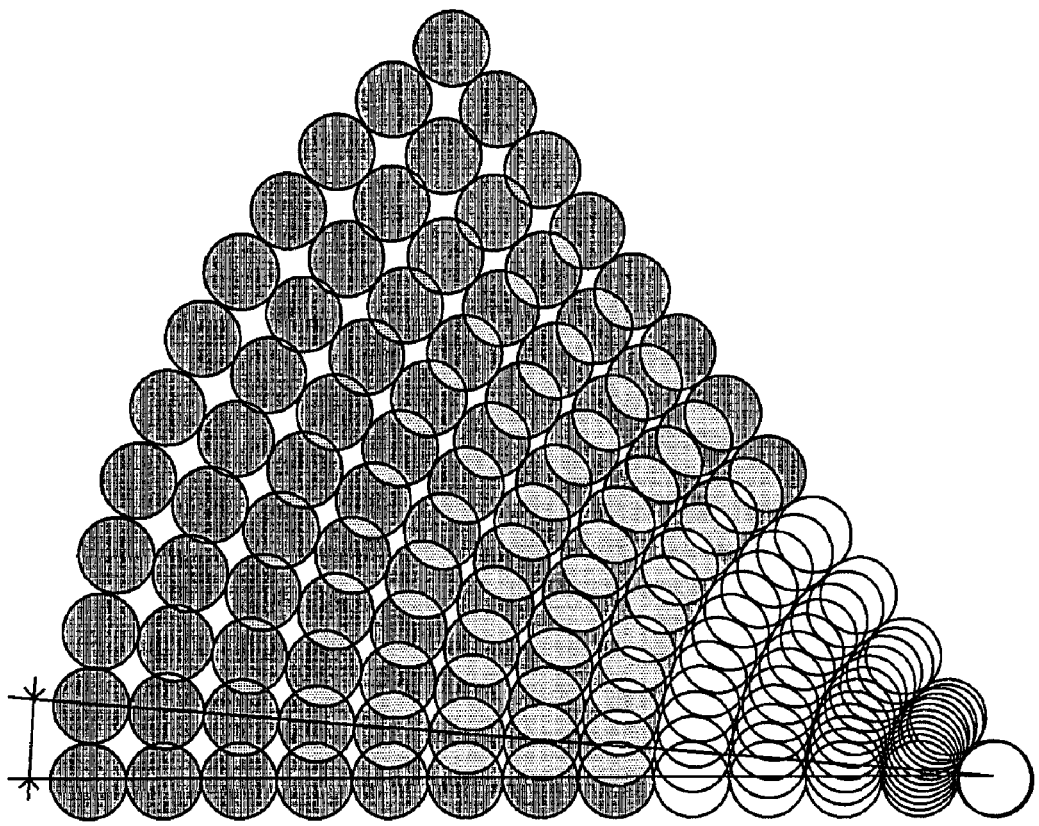

FIGS. 19A and 19B are diagrams for describing the overlapping of exposure between mutually adjacent pixels. In FIGS. 19A and 19B, a case is shown in which a color that has been produced is erased by the irradiation of light from the color erasure unit and an image is formed by the remaining colors. Consequently, the density of the colors forming the image becomes weaker, the greater the quantity of light irradiated from the color erasure unit, and therefore the density of the colors forming the image becomes weaker, the greater the number of exposure actions performed.

On the other hand, if using a monochrome medium which emits light directly as a result of the light from the light emitting sections, then the density of the colors forming the image becomes stronger, the greater the quantity of light emitted by the light emitting sections.

FIG. 19A shows a state where there is no overlap in the portions between adjacent pixels at the outermost circumference in the radial direction. In this case, light exposure by the respective light emitting sections 12 is performed at the pitch corresponding to the size of the printed dots. If this exposure pitch is adopted, then although it is possible to create partial overlap between pixels that are mutually adjacent in the circumferential direction on the inner circumferential side in the radial direction, there will be no overlap in the portions between mutually adjacent pixels at the outer circumference in the radial direction and therefore unexposed areas will arise.

On the other hand, FIG. 19B shows a state where, at the outermost circumference in the radial direction, there is an overlap in the circumferential direction between the adjacent pixels which is equivalent to the radius of the printed dots. In this case, the light exposure by the respective light emitting sections 12 is carried out at half of the pitch angle corresponding to the printed dot size. By adopting this exposure interval, there is an overlap corresponding to half the size of the printed dots between the adjacent pixels at the outermost circumference in the radial direction, and hence the surface area of the unexposed portions can be reduced.

In order to carry out exposure by partially overlapping between the pixels which are adjacent in the circumferential direction, the light emission by the light emitting sections 12 and the rotation of the medium are synchronized and the light emitting sections are driven each time the medium has rotated through a prescribed angle in such a manner that the light emitted by the light emitting sections 12 is irradiated onto the label surface of the medium.

For example, in performing light exposure by the respective light emitting sections 12 at one half of the pitch angle corresponding to the printed dot size, the light emitting sections 12 are driven to as to emit light each time that the medium 20 is rotated through one half of the pitch angle of the printed dot size.

In the composition described above, an example is shown in which light exposure is performed by the light emitting sections 12 at one half of the pitch angle of the printed dot size, but it is not limited to half of the pitch angle corresponding to the printed dot size, and any desired pitch angle that is equal to or smaller than the printed dot size can be used. The shorter the interval of the pitch angle at which exposure is carried out, the greater the amount of overlap and the smaller the surface area of the portion left without being exposed, but the greater the number of light exposure operations. Therefore, as described above, the print density of the overlapped portion becomes lower and is printed more weakly.

The decline in the print density on the inner circumference side in the radial direction causes tonal shading (gradation) in which the density reduces from the outer circumferential side towards the inner circumferential side when it is actually intended to print a single uniform density.

Therefore, in the plurality of light emitting sections provided in the light emitting unit according to the present invention, by making the quantity of light used to expose the pixels on the inner circumferential side in the radial direction smaller than the quantity of light used to expose the pixels on the outer circumferential side in the radial direction, the difference in tonal shading caused by superposition is reduced by restricting the decline in density created by the respective light exposure actions in the pixels on the inner circumferential side in the radial direction where there is large overlap between exposures.

Below, the inner and outer circumference tone correction processing carried out in S8 is described. The inner and outer circumference tone correction involves preparing tone correction data from the outer circumference to the inner circumference in accordance with the number of dots produced by the print head, calculating the pixel tone values of raster data of a polar coordinates system on the basis of this correction data in such a manner that the tone values become weaker toward the inner circumference, and hence adjusting the tones for each printed dot on the basis of the pixel tone values thus obtained.

This tone adjustment can be calculated by (tone value output from tone correction)=(input tone value)×(tone correction value per dot).

Here, the tone correction value can be expressed as the ratio of the corrected tone value/maximum tone value.

Figures 20A, 20B, 20C:
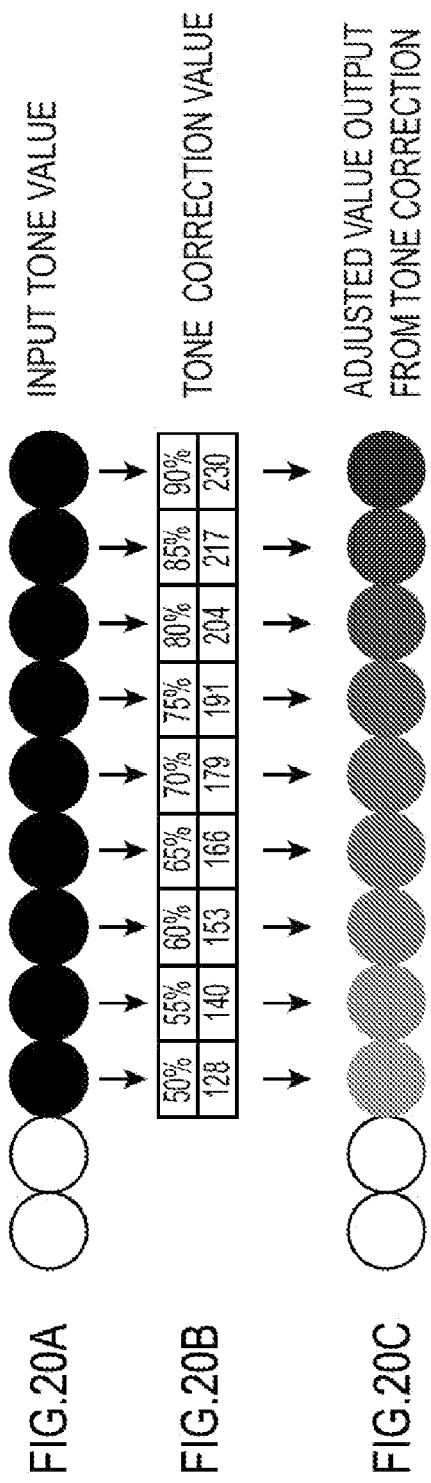
FIGS. 20A to 20C are diagrams for describing tone correction according to the present invention.

FIGS. 20A to 20C are diagrams for describing tone correction. FIG. 20B shows one example of tone correction data, which is set in a direction of decreasing tone values from the outer circumference toward the inner circumference. When the input tone values shown in FIG. 20A are adjusted by using the tone correction data in FIG. 20B, the tone correction output tone values in FIG. 20C are obtained. In FIGS. 20A to 20C, a case is shown in which tone adjustment is carried out by using the tone correction data in respect of input tone values which have a uniform tone value.

FIGS. 21A and 21B are diagrams for describing the quantity of light emitted by the light emitting sections of the light emitting unit according to the present invention, and the quantity of light is adjusted by using the tone correction data described above. Here, it is supposed that printing is to be carried out at a single uniform density.

FIG. 21A shows an approximate view of the quantity of light used to perform exposure in one irradiating action by the light emitting sections of one line which is arranged in the radial direction. Furthermore, FIG. 21B shows the total quantity of light resulting when the exposure light of the respective irradiating actions are superimposed on each other. Here, the upper part of the diagram shows the outer circumference side in the radial direction, and the lower part of the diagram shows the inner circumference side in the radial direction.

The quantity of light of the light emitting sections is reduced progressively from 70% to 30%, for example, from the outer circumference side toward the inner circumference side. If line-shaped light exposure is repeated while rotating the medium, then greater overlap occurs the nearer the position becomes to the inner circumferential side in the radial direction, but by making the quantity of light emitted by the respective light emitting sections gradually smaller, the nearer the position to the inner circumferential side, as described above, the smaller the amount of color erasure achieved by each of the respective exposure operations. Therefore, the total quantity of exposure light is able to achieve a substantially uniform density (FIG. 21B).

In the example described above, the quantity of light is reduced 5% at a time from 70% to 30%, but this reduction ratio is one example and the ratio is not limited to this, but rather it is also possible to reduce the quantity of light according to a non-linear ratio rather than a uniform linear ratio. Moreover, it is also possible to specify the quantity of light as desired. Furthermore, it is also possible to specify the quantity of light emitted by the respective light emitting sections in such a manner that the quantity of exposure light of the respective pixels becomes uniform as a result of the mutual superimposition of the exposure light (FIG. 21B).

The quantity of exposure light of the respective light emitting sections is dependent on the quantity of light emitted by the light emitting sections. In the light emitting sections according to the present invention, it is possible to adjust the quantity of light emitted on the basis of the drive current of the light emitting sections, the exposure time of the light emitting sections, and the number of exposure actions performed by the light emitting sections per unit time, and by means of this adjustment, the quantity of light emitted by the light emitting sections is adjusted between the inner circumferential side and the outer circumferential side in the radial direction, and hence the quantity of exposure light of the respective pixels is adjusted accordingly. The adjustment by means of the drive current of the light emitting sections, the light exposure time of the light emitting sections and the number of exposure operations performed by the light emitting sections per unit time are described below.

In FIG. 21, the plurality of light emitting sections provided in the light emitting unit are described by using an example where the quantity of light emitted is adjusted by taking each of the light emitting sections as respective operating units, but the light emitting unit of the present invention may also have a composition where a plurality of light emitting sections are divided into a plurality of blocks and light exposure is carried out by taking these blocks as respective operating units.

The light emitting sections included in the respective blocks may be driven under the same drive conditions or they may be driven under different drive conditions. Furthermore, rather than driving all of the blocks contained in the optical unit simultaneously, it is also possible to drive a block selected from all of the blocks contained in the optical unit.

By adopting a composition in which a block selected from all of the blocks is driven, the power consumption is reduced by driving only the block which is necessary, and furthermore, by driving the blocks in succession, it is possible to perform driving with a small drive power.

In the optical unit, the plurality of light emitting sections are divided into a plurality of blocks based on one light emitting section or a plurality of light emitting sections which are mutually adjacent in the radial direction, each of the blocks is driven as a respective unit, and the quantity of light emitted by the light emitting sections in the block on the inner circumferential side in the radial direction is made to be smaller than the quantity of light emitted by the light emitting sections in the block on the outer circumferential side in the radial direction.

Apart from a first mode in which each block contains substantially the same number of light emitting sections, the composition for dividing into blocks may also adopt a second mode in which each block contains different numbers of light emitting sections.

Figure 22:
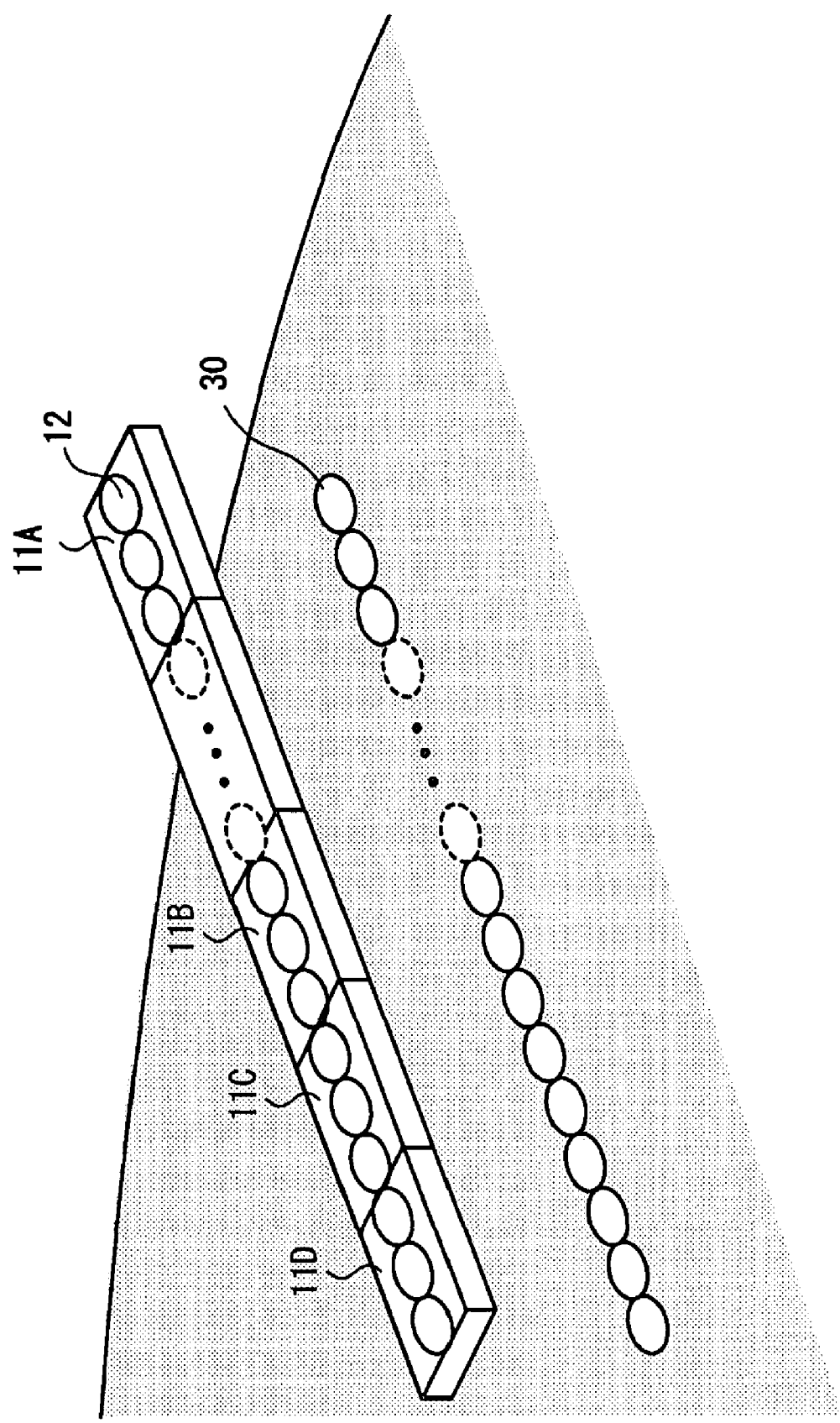
FIG. 22 is an approximate diagram for describing the block composition of the light emitting sections of the light emitting unit according to the present invention.

FIG. 22 is an approximate diagram for describing the block composition of the light emitting sections of the light emitting unit according to the present invention. The light emitting unit 10 comprises a plurality of light emitting sections 12 which are arranged in a line shape in the radial direction. The respective light emitting sections 12 are divided into a plurality of blocks each containing one light emitting section or a plurality of light emitting sections which are adjoining in the radial direction, and these light emitting sections are driven by taking the blocks as respective operating units. FIG. 22 shows an example in which the light emitting unit is divided into blocks 11A to 11D which each comprise three light emitting sections 12, but it is also possible to set the number of light emitting sections 12 provided in one block as desired.

The first mode is a composition where the number of light emitting sections 12 contained in each block is substantially the same. Here, the meaning of the number of light emitting sections being substantially the same is not limited to a case where the total number of light emitting sections provided in the light emitting unit can be divided exactly by the prescribed number of blocks. Therefore, the first mode includes a composition where the blocks contain a number of light emitting sections whereby a similar quantity of light is emitted when each of the blocks is driven under the same conditions.

Furthermore, the second mode is a composition where the number of light emitting sections contained in each block is different, and more desirably, the number of light emitting sections contained in the block on the inner circumferential side in the radial direction is made greater than the number of light emitting sections contained in the block on the outer circumferential side in the radial direction.

Below, the operation according to the first mode which adopts a composition in which each block contains substantially the same number of light emitting sections will be described with reference to FIGS. 23A to 23C and FIGS. 24A to 24F, and the operation according to the second mode which adopts a composition in which each block contains a different number of light emitting sections will be described with reference to FIGS. 25A to 25C and FIGS. 26A to 26F.

Figure 23A:
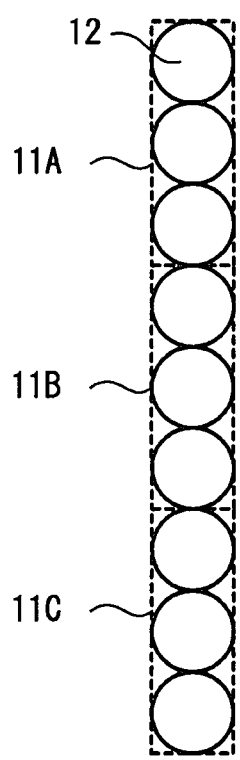
FIGS. 23A to 23C are diagrams for describing an operation according to a first mode which adopts a composition wherein the respective blocks according to the present invention contain substantially the same number of light emitting sections.
Figure 23B:
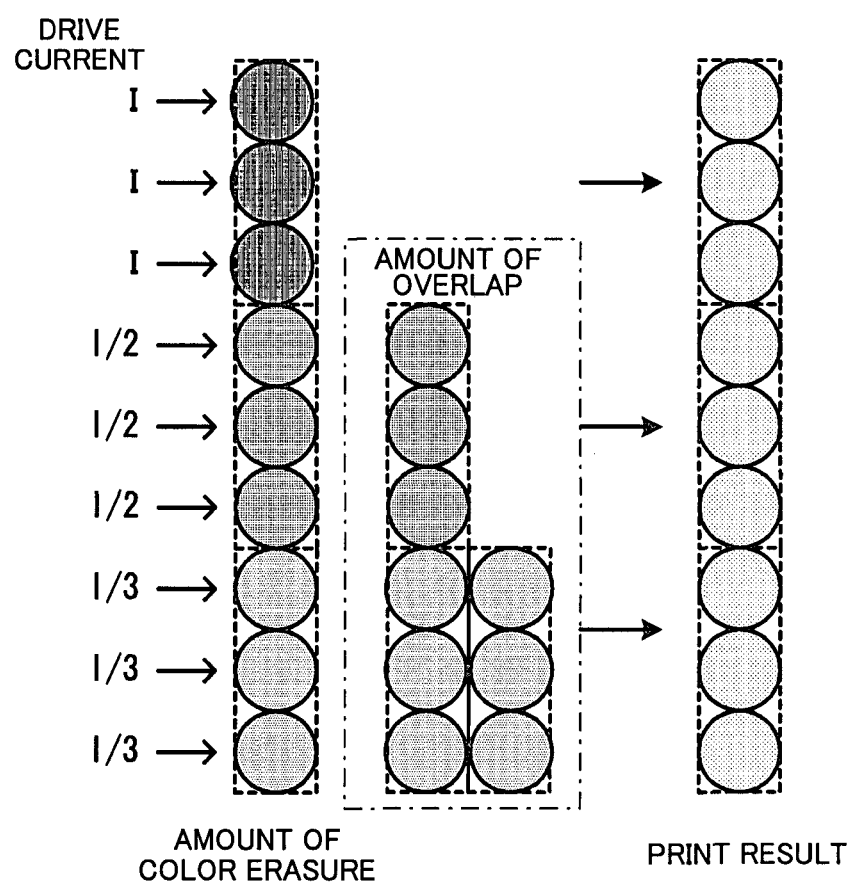
Figure 23C:
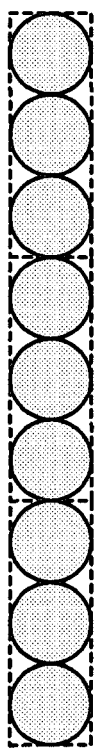

Firstly, the operation according to the first mode will be described. FIGS. 23A to 23C depict light emitting sections 12 which are arranged in a line configuration in the radial direction, the upper part of the diagram corresponding to the outer circumferential side and the lower part of the diagram corresponding to the inner circumferential side.

In FIG. 23A, the blocks 11A to 11C are constituted by sets of equal numbers of light emitting sections 12 (here, three light emitting sections) which are adjoining in the radial direction, and the light emitting sections 12 contained in each respective block are driven under the same conditions and furthermore the blocks are driven under conditions whereby the quantity of light emitted by the respective light emitting sections contained in the block on the inner circumferential side is smaller than the quantity of light emitted by the respective light emitting sections contained in the block on the outer circumferential side. Here, the drive conditions can be taken as the drive current, the drive time and the number of driving operations per unit time.

For example, a drive current of the same current value is supplied to each of the light emitting sections 12 contained in each respective block so as to drive the light emitting sections, and furthermore the drive current supplied to the respective light emitting sections contained in the block on the inner circumferential side is made smaller than the drive current supplied to the respective light emitting sections contained in the block on the outer circumferential side.

In FIG. 23B, for example, the light emitting sections 12 contained in block 11A are driven at a drive current of I, the light emitting sections 12 contained in block 11B are driven at a drive current of I/2, and the light emitting sections 12 contained in the block 11C are driven at a drive current of I/3. FIGS. 24A to 24C show the drive currents for the blocks A to C in a case where the light emitting sections contained in the respective blocks are driven by taking the drive currents described above as the drive condition.

By this means, the respective light emitting sections 12 contained in the blocks A to C are driven by a progressively smaller current in order from block C to block B to block A, and therefore the quantity of light emitted becomes smaller in this same order of the blocks.

Here, the block present on the inner circumferential side in the radial direction has a greater overlap of the exposure light than the block on the outer circumferential side. FIG. 23B shows a schematic view of the state of overlap of the exposure light which is depicted as one overlap amount in block 11B and two overlap amounts in block 11C.

The quantity of exposure light used to expose the respective pixels by the light-emitting unit is dependent on the total quantity of light determined by multiplying the quantity of light emitted by the respective blocks 11A to 11C described above by the amount of overlap. FIG. 23C shows a schematic view of the quantity of exposure light used to expose each of the pixels, and on the basis of the quantity of light emitted by the light emitting sections contained in the respective blocks in FIG. 23B and the amount of overlap, substantially the same quantity of light is emitted in each of the blocks and therefore exposure by substantially the same quantity of light is performed onto each of the pixels.

FIGS. 23A and 23B show a case where the light emitting sections contained in the respective blocks are driven by using the drive current as the drive condition, but it is also possible to use the drive time or the number of drive operations per unit time as the drive condition.

FIGS. 24D to 24F show the drive times for the respective blocks A to C, in a case where the light emitting sections contained in the respective blocks are driven by using the drive time as the drive condition. In this case, the drive current is the same in each of the blocks.

Furthermore, FIGS. 24G to 24I show the number of drive operations per unit time for the blocks A to C, in a case where the light emitting sections contained in the respective blocks are driven by using the number of drive operations per unit time as the drive condition. In this case, the drive current and the drive time in each drive operation is the same in each of the blocks. It is also possible to combine the respective drive conditions described above.

In FIGS. 23A to 23C and FIGS. 24A to 24I, a case is shown in which the light emitting sections are divided into blocks, but, as shown in FIGS. 21A and 21B, in a case where the drive conditions are specified respectively for each individual light emitting section, it is also possible to set the drive conditions on the basis of the drive current, the drive time or the number of drive operations per unit time, or a combination of these, in a similar fashion.

Figure 25A:
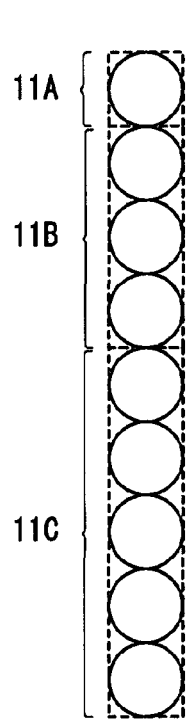
FIGS. 25A to 25C are diagrams for describing an operation according to a second mode which adopts a composition wherein the respective blocks according to the present invention contain different numbers of light emitting sections.
Figure 25B:
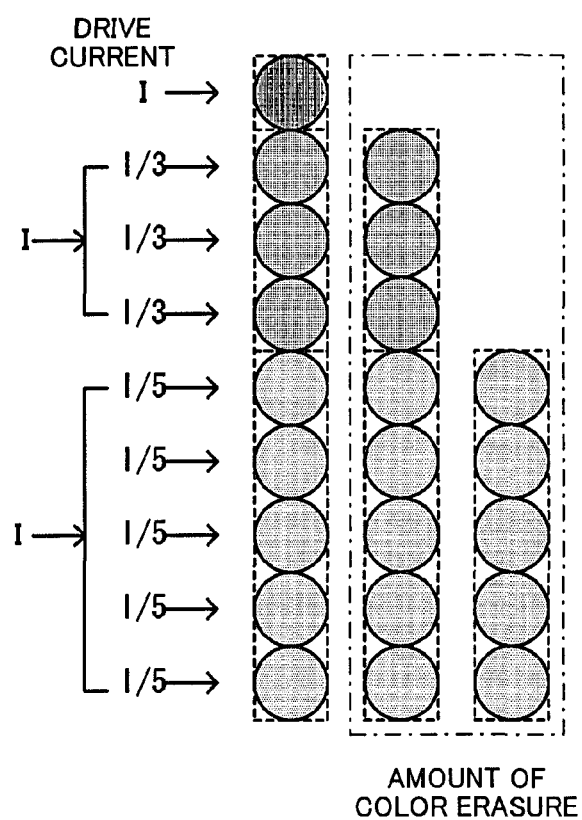
Figure 25C:
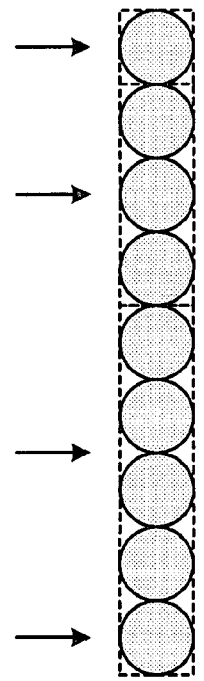

Next, the operation according to the second mode will be described. FIGS. 25A to 25C depict light emitting sections 12 which are arranged in a line configuration in the radial direction, the upper part of the diagram corresponding to the outer circumferential side and the lower part of the diagram corresponding to the inner circumferential side.

In FIG. 25A, the number of light emitting sections contained in the block at the inner circumferential surface in the radial direction (the lower side in FIGS. 25A to 25C) is set to be greater than the number of light emitting sections contained in the block at the outer circumferential surface (the upper side in FIGS. 25A to 25C). FIG. 25A shows an example in which the number of light emitting sections 12 contained in the block 11A is one, the number of light emitting sections 12 contained in the block 11B is three and the number of light emitting sections 12 contained in the block 11C is five.

The respective blocks 11A to 11C are driven by supplying the same drive current to each block unit, and in each of the blocks the light emitting sections are driven by dividing the supplied current into equal parts.

For example, if the amount of drive current supplied to each block is taken to be I, then the same amount of current I is supplied to each of the blocks 11A to 11C. In this case, since the block 11A includes one light emitting section 12, the light emitting section 12 is driven by the current value I. On the other hand, the block 11B includes three light emitting sections 12, and therefore the respective light emitting sections 12 are driven by a current value of I/3, and furthermore the block 11C includes five light emitting sections 12, and therefore the respective light emitting sections 12 are driven by the current value of I/5.

FIGS. 26A to 26F are diagrams for describing the current according to the second mode; FIGS. 26A to 26C show the amount of current supplied to each block, and FIGS. 26D to 26F show the amount of current supplied to each light emitting section contained in each of the blocks. As shown in FIGS. 26D to 26F, the amount of current supplied to each of the light emitting sections in the block is a smaller current value on the inner circumference side in the radial direction than on the outer circumferential side in the radial direction. By this means, the quantity of light emitted by the light emitting sections contained in the block on the inner circumferential side is smaller than the quantity of light emitted by the respective light emitting sections contained in the block on the outer circumferential side.

Here, as described previously, the block situated on the inner circumferential side in the radial direction has a greater amount of overlap in the light exposure than the block on the outer circumferential side. FIG. 25B shows a schematic view of the state of overlap of the light exposure, which is depicted as one overlap amount in block 11B and two overlap amounts in block 11C.

The quantity of exposure light used to expose the respective pixels by the light emitting unit is dependent on the total quantity of light determined by multiplying the amount of light emitted by the blocks 11A to 11C described above by the amount of overlap. FIG. 25C shows a schematic view of the quantity of exposure light used to expose each of the pixels, and on the basis of the quantity of light emitted by the light emitting sections contained in the respective blocks in FIG. 25B and the amount of overlap, substantially the same quantity of light is emitted in each of the blocks, and therefore exposure by substantially the same quantity of light is performed onto each of the pixels.

As described above, by harmonizing the quantity of exposure light irradiated onto the pixels on the inner circumferential side and the outer circumferential side in the radial direction, the amount of erasure of the generated color is approximately the same and therefore it is possible to suppress the occurrence of tonal shading of the density in the radial direction.

In the description given above, an example is described in which a coloring material that is coated onto the label surface of the medium is caused to emit light by the light emitting unit and a desired color is formed by erasing color by means of a color erasure unit, but in the case of a coloring material which produces a single color, for example, it is possible to omit the color erasure step and to produce a color by means of ultraviolet light only. If producing a single color in this way, or if using thermo-optical conversion which produces a color by means of infrared light of a different wavelength, or using photosensitive or thermosensitive recording which performs exposure with RGB light, develops by application of heat, and performs fixing by application of light, or the like, the relationship between the quantity of exposure light and the density is the inverse of the relationship described above. However, by making the quantity of light exposed onto the pixels on the inner circumferential side in the radial direction smaller than the quantity of light exposed onto the pixels on the outer circumferential side in the radial direction, it is possible to suppress the occurrence of tonal shading of the density in the radial direction, in a similar fashion to the foregoing.

Below, the quantity of light non-uniformity correction processing carried out in step S9 is described with reference to FIGS. 27A to 27C and FIGS. 28A to 28D.

Figures 27A, 27B, 27C:
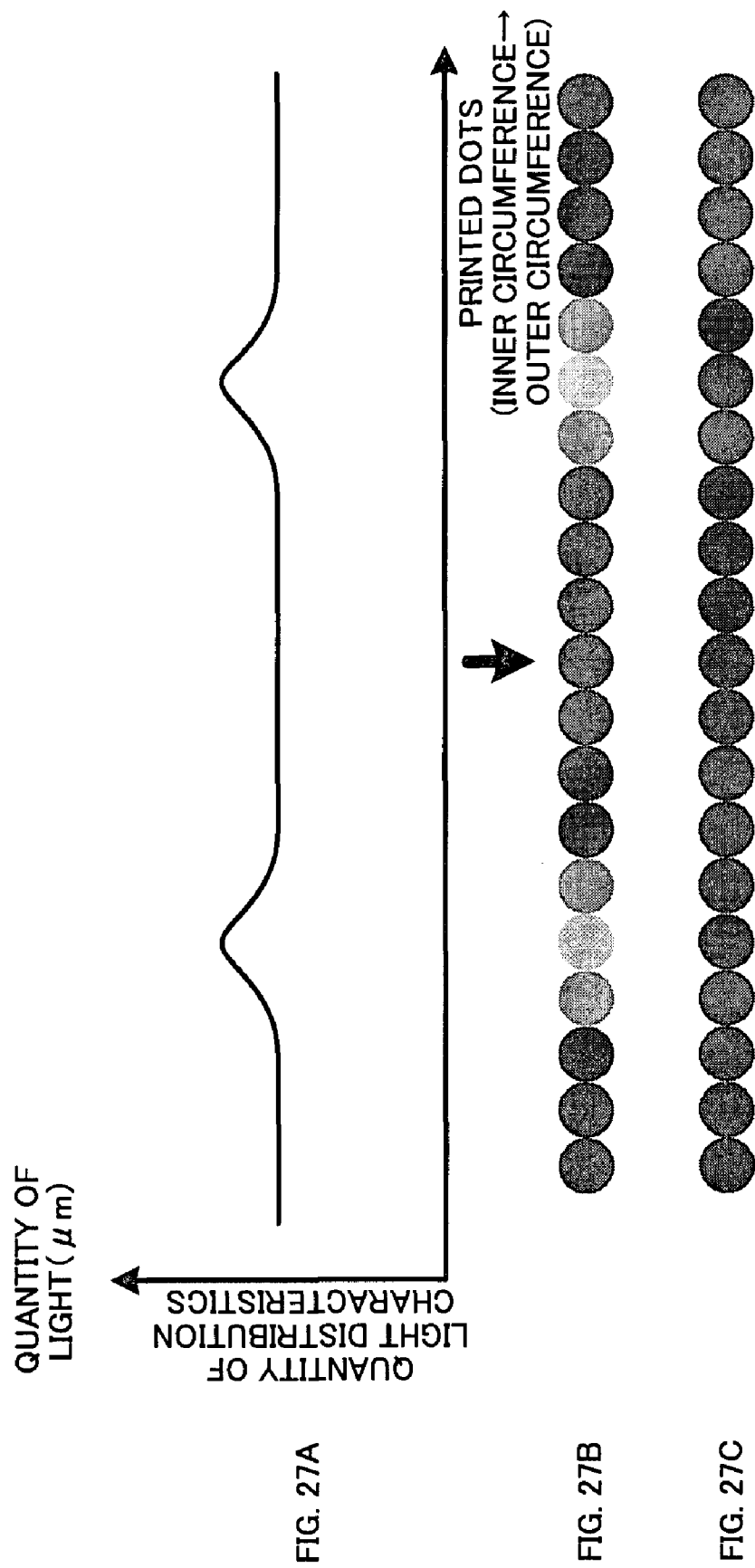
FIGS. 27A to 27C are diagrams for describing a quantity of light non-uniformity correction process according to the present invention.
Figure 29:
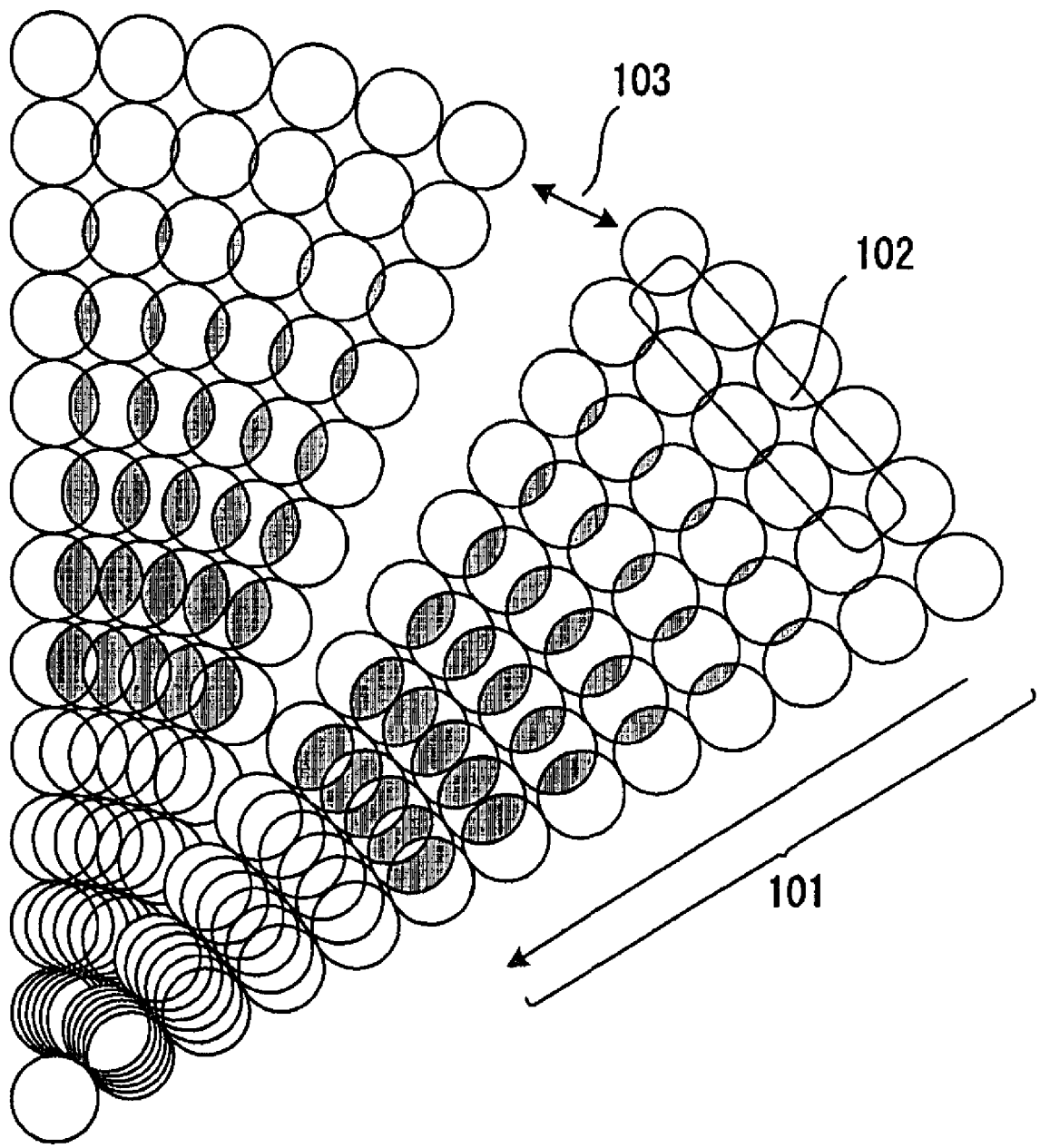
FIG. 29 is a diagram for describing printing problems when printing onto a disk-shaped recording medium.

If LED light is used for exposure by employing a lens (Selfoc), then non-uniformities may occur in the distribution of the quantity of light on the printed dots. FIG. 27A shows the state of non-uniformities included in the quantity of light distribution characteristics of the printed dots. When one line is printed in the main scanning direction in a state where there is non-uniformity in the quantity of light distribution of the printed dots, then non-uniformity in the density occurs as shown in FIG. 27B. FIG. 27C shows a case where there is no non-uniformity in the density.

Here, the quantity of light is measured for each dot, a LED quantity of light correction value is prepared for each printed dot by aligning the light exposure peak with the lowest light exposure value, and the quantity of light is corrected to the tone value output from the tone correction process in step S8.

This quantity of light non-uniformity correction can be calculated by:

(output tone value)=(tone value output from tone correction)×(quantity of light non-uniformity correction value for each dot).

Here, the quantity of light non-uniformity correction value can be expressed as the ratio of the lowest light exposure value/the peak value.

FIG. 28A shows the peak characteristics included in the quantity of light distribution characteristics of the printed dots and FIG. 28B shows an example of quantity of light correction data. The output adjustment result in FIG. 28D shows an example where the non-uniformity in the quantity of light shown in FIG. 28C is corrected by using the quantity of light non-uniformity correction values.

The invention claimed is:

1. The image forming apparatus which forms an image by exposing the surface of a disk-shaped medium for respective pixels by means of light irradiated from an optical unit, characterized in that the optical unit has a plurality of light emitting sections which are arranged in the radial direction of the medium; and the exposure is carried out by mutually overlapping a portion of pixels which are adjacent in the circumferential direction of the medium, in respect of all of the pixels on the medium;

the plurality of light emitting sections emit light simultaneously, wherein the light emitting sections perform exposure in synchronism with rotational driving for rotating the medium, and in this light exposure, the amount of movement in the circumferential direction along which the outermost circumference of the medium moves during the interval between exposures is made smaller than the width in the circumferential direction of the pixels which are formed by the light exposure.

2. The image forming apparatus as defined in claim 1, characterized in that the quantity of light for exposing a pixel on the inner circumferential side in the radial direction is made smaller than the quantity of light for exposing a pixel on the outer circumferential side in the radial direction for the respective exposure positions of the plurality of light emitting sections for the medium.

3. The image forming apparatus as defined in claim 2, characterized in that the quantity of exposure light of the plurality of light emitting sections is set, for the respective exposure positions for the medium, by making the drive current of the light emitting sections which expose pixels on the inner circumferential side in the radial direction smaller than the drive current of the light emitting sections which expose pixels on the outer circumferential side in the radial direction.

4. The image forming apparatus as defined in claim 2, characterized in that the quantity of exposure light of the plurality of light emitting sections is set, for the respective exposure positions for the medium, by making the exposure time for exposing pixels on the inner circumferential side in the radial direction shorter than the exposure time for exposing pixels on the outer circumferential side in the radial direction.

5. The image forming apparatus as defined in claim 2, characterized in that the quantity of exposure light of the plurality of light emitting sections is set, for the respective exposure positions for the medium, by making the number of exposures per unit time for exposing pixels on the inner circumferential side in the radial direction lower than the number of exposures per unit time for exposing pixels on the outer circumferential side in the radial direction.

6. The image forming apparatus as defined in claim 1, characterized in that the plurality of light emitting sections are divided into a plurality of blocks each consisting of one or a plurality of light emitting sections which are mutually adjoining in the radial direction;

the number of light emitting sections belonging to each block is set in such a manner that the number of light emitting sections belonging to a block on the inner circumferential side in the radial direction is greater than the number of light emitting sections belonging to a block on the outer circumferential side in the radial direction; and the same drive current is supplied to each of the blocks, the light emitting sections are driven by dividing the drive current amongst the number of light emitting sections in each block, and the quantity of light emitted by each of the blocks is made to be substantially the same quantity of light.

7. The image forming apparatus which forms an image by exposing the surface of a disk-shaped medium for respective pixels by means of light irradiated from an optical unit, characterized in that the optical unit has a plurality of light emitting sections which are arranged in the radial direction of the medium; and the exposure is carried out by mutually overlapping a portion of pixels which are adjacent in the circumferential direction of the medium, in respect of all of the pixels on the medium;

the plurality of light emitting sections are divided into a plurality of blocks on the basis of one or a plurality of light emitting sections which are mutually adjoining in the radial direction; and the light emitting sections within each block are driven as a single unit, and the quantity of light emitted by the light emitting sections in a block on the inner circumferential side in the radial direction is made smaller than the quantity of light emitted by the light emitting sections in a block on the outer circumferential side in the radial direction.

8. The image forming apparatus as defined in claim 7, characterized in that, within each of the blocks, the plurality of light emitting sections contained in the block are driven under respectively different drive conditions.

9. The image forming apparatus as defined in claim 7, characterized in that
each of the blocks has substantially the same number of light emitting sections; and
within each of the blocks, the plurality of light emitting sections contained in the block are driven under the same drive conditions, and the respective blocks are driven under different drive conditions.

10. The image forming apparatus as defined in claim 9, characterized in that the relationship in the quantity of light between the blocks is set by making the drive current of the light emitting sections in a block on the inner circumferential side in the radial direction smaller than the drive current of the light emitting sections in a block on the outer circumferential side in the radial direction.

11. The image forming apparatus as defined in claim 9, characterized in that the relationship in the quantity of light between the blocks is set by making the drive time of the light emitting sections in a block on the inner circumferential side in the radial direction shorter than the drive time of the light emitting sections in a block on the outer circumferential side in the radial direction.

12. The image forming apparatus as defined in claim 9, characterized in that the relationship in the quantity of light between the blocks is set by making the number of light emission operations per unit time of the light emitting sections in a block on the inner circumferential side in the radial direction smaller than the number of light emission operations per unit time of the light emitting sections in a block on the outer circumferential side in the radial direction.

* * * * *